(12) United States Patent
Webster et al.

(10) Patent No.: US 8,299,200 B2
(45) Date of Patent: *Oct. 30, 2012

(54) ANCHORED POLYSILOXANE-MODIFIED POLYURETHANE COATINGS AND USES THEREOF

(75) Inventors: Dean C. Webster, Fargo, ND (US); Abdullah Ekin, Imperial, PA (US); Stacy Sommer, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/663,334

(22) PCT Filed: Jun. 9, 2008

(86) PCT No.: PCT/US2008/066306
§ 371 (c)(1),
(2), (4) Date: Jul. 23, 2010

(87) PCT Pub. No.: WO2009/025924
PCT Pub. Date: Feb. 26, 2009

(65) Prior Publication Data
US 2010/0280148 A1    Nov. 4, 2010

Related U.S. Application Data

(60) Provisional application No. 60/934,093, filed on Jun. 11, 2007, provisional application No. 60/997,156, filed on Oct. 1, 2007.

(51) Int. Cl.
*C08G 77/26* (2006.01)
(52) U.S. Cl. .......................... 528/38; 528/28
(58) Field of Classification Search ............ 528/38, 528/28
See application file for complete search history.

(56) References Cited

U.S. PATENT DOCUMENTS

| | | | |
|---|---|---|---|
| 4,125,491 A | 11/1978 | Gorman | |
| 4,298,543 A | 11/1981 | Law et al. | |
| 4,687,813 A | 8/1987 | Lenz et al. | |
| 4,697,913 A | 10/1987 | Kuramoto et al. | |
| 4,902,767 A | 2/1990 | Roitman et al. | |
| 4,910,252 A | 3/1990 | Yonehara et al. | |
| 4,933,178 A | 6/1990 | Capelli | |
| 5,001,210 A | 3/1991 | Coury et al. | |
| 5,019,096 A | 5/1991 | Fox, Jr. et al. | |
| 5,203,991 A | 4/1993 | Kutsuna et al. | |
| 5,237,082 A | 8/1993 | Leir et al. | |
| 5,641,855 A | 6/1997 | Scherr et al. | |
| 5,986,018 A | 11/1999 | Yamaguchi et al. | |
| 6,030,632 A | 2/2000 | Sawan et al. | |
| 6,099,897 A | 8/2000 | Sayo et al. | |
| 6,153,724 A | 11/2000 | Hollingsworth | |
| 6,224,579 B1 | 5/2001 | Modak et al. | |
| 6,369,186 B1 | 4/2002 | Branlard et al. | |
| 6,387,997 B1 | 5/2002 | Grolemund et al. | |
| 6,413,446 B1 | 7/2002 | Mechtel et al. | |
| 6,458,878 B1 | 10/2002 | Tsuboi et al. | |
| 6,482,912 B2 | 11/2002 | Boudjouk et al. | |
| 6,500,549 B1 | 12/2002 | Deppisch et al. | |
| 6,524,564 B1 | 2/2003 | Kim et al. | |
| 6,559,201 B2 | 5/2003 | Simendinger, III | |
| 6,716,895 B1 | 4/2004 | Terry | |
| 6,818,674 B2 | 11/2004 | Sakata et al. | |
| 6,861,493 B2 | 3/2005 | Bauer et al. | |
| 6,949,598 B2 | 9/2005 | Terry | |
| 7,098,256 B2 | 8/2006 | Ong et al. | |
| 7,141,183 B2 | 11/2006 | Hattori et al. | |
| 7,179,789 B2 | 2/2007 | Patt | |
| 7,204,940 B2 | 4/2007 | McDonald et al. | |
| 7,345,131 B2 | 3/2008 | Selbertinger et al. | |
| 7,378,156 B2 | 5/2008 | Terry | |
| 7,449,537 B2 | 11/2008 | Boudjouk et al. | |
| 7,452,956 B2 | 11/2008 | Cheng et al. | |
| 7,544,722 B2 | 6/2009 | Boudjouk et al. | |
| 7,825,166 B2 | 11/2010 | Sasaki et al. | |
| 8,062,729 B2 | 11/2011 | Webster et al. | |
| 2002/0013385 A1 | 1/2002 | Simendinger, III | |
| 2002/0091170 A1 | 7/2002 | Sakata et al. | |
| 2002/0098214 A1 | 7/2002 | Adams et al. | |
| 2002/0156223 A1 | 10/2002 | Boudjouk et al. | |
| 2003/0022793 A1 | 1/2003 | Ring et al. | |
| 2003/0044451 A1 | 3/2003 | McGhee et al. | |
| 2003/0129421 A1 | 7/2003 | Terauchi et al. | |
| 2003/0207962 A1 | 11/2003 | Oya et al. | |
| 2003/0236552 A1 | 12/2003 | Roby | |
| 2004/0116551 A1 | 6/2004 | Terry | |
| 2005/0009985 A1 | 1/2005 | Selbertinger et al. | |

(Continued)

FOREIGN PATENT DOCUMENTS

CA    2 413 672 A1    8/2003

(Continued)

OTHER PUBLICATIONS

Abstract for Japanese Publication No. JP 11-222402, Publication Date Aug. 17, 1999, Patentee or Applicant listed as Osaka Gas Co. Ltd., 1 page.
Abstract for Japanese Publication No. JP 2001-029451 (A), "Antibacterial Urethral Catheter and Manufacture of the same," Toyo Boseki et al., publication date Feb. 6, 2001, 1 page.
Abstract for JP 2000-264803, "Silver Microbide-Containing Photopolymerizable Monomer Compositions, and Solventless UV- or Electron Beam-Curable Resin Compositions Containing Them," Takeuchi et al., publication date Sep. 26, 2000, 1 page.
Abstract for JP 51-17554, "UV-Curable Antimicrobial Acrylic Coating Materials," Honda et al., publication date May 14, 1993, 1 page.

(Continued)

*Primary Examiner* — Kuo-Liang Peng
(74) *Attorney, Agent, or Firm* — Foley & Lardner LLP

(57) ABSTRACT

A polymeric material, prepared by reacting a mixture comprising a polyorganosiloxane having one or more isocyanate-reactive functional groups, polyisocyanate, and polyol, is provided. The isocyanate-reactive functional groups, typically one or two, are attached to only a single end of the polyorganosiloxane chains. The polymeric material may be used to form coatings on a substrate and to inhibit fouling on surfaces exposed to aqueous conditions.

31 Claims, 4 Drawing Sheets

U.S. PATENT DOCUMENTS

| | | |
|---|---|---|
| 2005/0080158 A1 | 4/2005 | Ong et al. |
| 2005/0129962 A1 | 6/2005 | Amidaiji et al. |
| 2005/0227092 A1 | 10/2005 | Yamaya et al. |
| 2006/0014015 A1 | 1/2006 | Travelute et al. |
| 2006/0223969 A1 | 10/2006 | Roesler et al. |
| 2006/0276608 A1 | 12/2006 | Lang et al. |
| 2007/0021529 A1 | 1/2007 | Boudjouk et al. |
| 2007/0042199 A1 | 2/2007 | Chisholm et al. |
| 2007/0048344 A1 | 3/2007 | Yahiaoui et al. |
| 2007/0093618 A1 | 4/2007 | Cheng et al. |
| 2007/0129474 A1 | 6/2007 | Salamone et al. |
| 2007/0132949 A1 | 6/2007 | Phelan |
| 2008/0081847 A1 | 4/2008 | Sasaki et al. |
| 2008/0112920 A1 | 5/2008 | Chia et al. |
| 2008/0181862 A1 | 7/2008 | Chisholm et al. |
| 2008/0199536 A1 | 8/2008 | Terry |
| 2008/0213599 A1 | 9/2008 | Webster et al. |
| 2009/0017288 A1 | 1/2009 | Webster et al. |
| 2009/0018276 A1 | 1/2009 | Boudjouk et al. |
| 2009/0111937 A1 | 4/2009 | Webster et al. |
| 2009/0143496 A1 | 6/2009 | Ziche |
| 2009/0194733 A1 | 8/2009 | Schulz et al. |
| 2009/0215762 A1 | 8/2009 | Stafslien et al. |
| 2010/0004202 A1 | 1/2010 | Chisholm et al. |

FOREIGN PATENT DOCUMENTS

| | | |
|---|---|---|
| CA | 2 621 000 A1 | 3/2007 |
| EP | 1 496 079 B1 | 1/2005 |
| EP | 1 707 583 | 10/2006 |
| EP | 1 884 530 | 11/2006 |
| JP | 2-47371 | 2/1990 |
| JP | 2002-187929 | 7/2002 |
| WO | WO 2005/030405 A2 | 4/2005 |
| WO | WO 2006/086092 | 8/2006 |
| WO | WO 2006/086092 A2 | 8/2006 |
| WO | WO 2006/121937 A1 | 11/2006 |
| WO | WO 2007/053163 A2 | 5/2007 |
| WO | WO 2008/008077 A2 | 1/2008 |
| WO | WO 2009/025924 A2 | 2/2009 |

OTHER PUBLICATIONS

U.S. Appl. No. 60/934,093, filed Jun. 11, 2007, Webster et al.
U.S. Appl. No. 12/378,049, filed Feb. 10, 2009, Stafslien et al.
U.S. Appl. No. 12/633,334, filed Dec. 7, 2009, Webster et al.
U.S. Appl. No. 11/810,696, filed Jun. 6, 2007, Webster et al.
Abstract for JP 60-09919, "Crosslinked Urethane Acrylate Polymer Particle-Containing Antimicrobial Coatings," Honda et al., publication date Jan. 18, 1994, 1 page.
Bullock et al., "Surface Science of a Filled Polydimethylsiloxane-Based Alkoxysilane-Cured Elastomer: RTV11[1]," *Journal of Colloid and Interface Science*, 1999, vol. 210, pp. 18-36, Article ID jcis.1998.5856, available online at http://www.idealibrary.com.
Chen et al., *Macromolecules*, 1995, vol. 28, pp. 1635-1642.
Chen et al., "Solvent Effects on the Surface Composition of Poly(dimethylsiloxane)-co-Polystyrene/Polystyrene Blends," *Macromolecules*, 1998, vol. 31, No. 26, pp. 9328-9336.
El-Hayek et al., Bacteriostatic polymer film immobilization. *Journal of biomedical materials research*. Part A 2006, vol. 79 No. 4, pp. 874-881 (Plus Cover Sheet, 9 pages total).
Ha et al., *Journal of Macromolecular Science, Polymer Reviews*, 2005, vol. C45, 32 pgs.
Ho et al., "Polydimethylsiloxane-Urea-Urethane Copolymers with 1,4-Benzenedimethanol as Chain Extender," *Macromolecules*, 1993, vol. 26, No. 25, pp. 7029-7036.
Iojoiu et al., "Modified poly (ε-caprolactone)s and their use for drug-encapsulating nanoparticles," Journal of Polymer Science Part A: Polymer chemistry, 2004, vol. 42, No. 3, pp. 689-700.
Jiang et al., Preparation of crosslinked polystyrenes with quaternary ammonium and their antibacterial behavior *Reactive & Functional Polymers* 2005, vol. 62, 5 pages.
Johnston et al., "Networks from α,ω-Dihydroxpoly(dimethylsiloxane) and (Tridecafluoro-1,1,2,2-tetrahydrooctyl)triethoxysilane: Surface Microstructures and Surface Characterization," *Macromolecules*, 1999, vol. 32, No. 24, pp. 8173-8182.

Karal et al., "Blend of polycaprolactone-poly (dimethylsiloxane)-polycaprolactone triblock copolymer with poly(vinyl chloride) preparation and characterization," Polymer, 1997, vol. 38, No. 24, pp. 6071-6078.
Lee et al., *Journal of Applied Polymer Science*, 2003, vol. 87, pp. 375-380.
Lenoir et al., Antimicrobial activity of polystyrene particles coated by photo-crosslinked block copolymers containing a biocidal polymethacrylate block. e-Polymers 2005, 11 pages.
Mahoney et al., *Macromolecules*, 2002, vol. 35, pp. 5256-5266.
Patel et al., *Macromolecules*, 1988, vol. 21, pp. 2689-2696.
Pike et al., "Water-Induced Surface Rearrangements of Poly(dimethylsiloxane-urea-urethane) Segmented Block Copolymers," *Chem. Mater.*, 1996, vol. 8, No. 4, pp. 856-860.
Schweizer, Triclosan: a widely used biocide and its link to antibiotics. *FEMS Microbiology Letters*, 2001, vol. 202, No. 1, pp. 1-7 (Plus Cover Sheet, 9 pages total).
Smetankina et al., "Reactivity of organosilicon diisocyanates," XVII, Carcofunctional organosilicon compounds, Zhurnal Obshchei Khimii, 1974, vol. 44, No. 12, pp. 2638-2641.
Smith et al., *Macromolecules*, 1992, vol. 25, pp. 2575-2581.
Tanaka, et al., *Physical Review Letters*, 1992, vol. 68, No. 18, pp. 2794-2797 (Plus Figure, 5 pages total).
Tang et al., "Anti-inflammatory properties of triblock siloxane copolymer-blended materials," Biomaterials, 1999, vol. 20, pp. 1365-1370.
Tezuka et al., "Environmentally induced Macromolecular Rearrangement on the Surface of Polyurethane-Polysiloxane Block Copolymers," *J. Chem. Soc. Paraday Trans.*, 1991, vol. 87, pp. 147-152.
Tezuka et al., "Environmentally Induced Macromolecular Rearrangement on the Surface of Polyurethane-Polysiloxane Graft Copolymers," *Journal of Colloid and Interface Science*, May 1990, vol. 136, No. 2, pp. 408-414.
Thomas et al., "Silicones Containing Pendant Biocides for Antifouling Coatings," *Biofouling*, vol. 20, Nos. 4/5, Aug./Oct. 2004, pp. 227-236.
Wynne et al., "Poly(dimethysiloxane)-Urea-Urethane Copolymers," Synthesis and Surface Properties, Chapter 7, Ingoranic and Organometallic Polymers II, *Am. Chem. Soc.*, 1994, pp. 64-80.
Wynne et al., *ACS Symposium Series*, 1994, vol. 572, pp. 64-80.
Yilgor et al., "Novel triblock siloxane copolymer: Synthesis, characterization, and their use as surface modifying additives," Journal of Polymer Science Part A: Polymer chemistry, 1989, pp. 3673-3690.
Zhuang et al., "Determination of the Distribution of Poly(dimethylsiloxane) Segment Lengths at the Surface of Poly[(dimethylsiloxane)-urethane]-Segmented Copolymers by Time-of-Flight Secondary Ion Mass Spectrometry," *Macromolecules*, 1997, vol. 30, No. 4, pp. 1153-1157.
Abstract for JP 2007246576 (A), "Water Paint Composition", Matsushita Kumiko et al., publication date Sep. 27, 2007 (1 pg.).
Abstract for JP 2003-327912, "Primer Antifouling Coating Material Composition for Ship, Composite Antifouling Coating Film for Ship, Method for Forming the Composite Antifouling Coating Film, Ship Coated with the Composite Antifouling Coating Film and Antifouling Method for Outer Hull of Ship", Masuda Hiroshi et al., publication date Nov. 19, 2003 (1 pg.).
Abstract for JP 4370163, "Coating Composition", Masuoka Shigeru et al., publication date Dec. 22, 1992 (1 pg.).
Abstract for JP 63277222, "Curing Resin", Murata Tsutomu et al., publication date Nov. 15, 1988 (1 pg.).
Abstract for JP 63-270738, "Polyamine/Polysiloxane Block Copolymer", Tezuka Yasushi et al., publication date Nov. 8, 1988 (1 pg.).
Abstract for JP 53-139653, "Marine Antifouling Material", Takamizawa Minoru et al., publication date Dec. 6, 1978 (1 pg.).
Adhikari et al., "Mixed Macrodiol-Based Siloxane Polyurethanes: Effect of the Comacrodiol Structure on Properties and Morphology", *Journal of Applied Polymer Science*, vol. 78, 2000 (pp. 1071-1082).
Cassé et al., "Laboratory screening of coating libraries for algal adhesion," *Biofouling*, vol. 23 (3/4), 2007 (pp. 267-276).

Ekin et al., Combinatorial and High-Throughput Screening of the Effect of Siloxane Composition on the Surface Properties of Crosslinked Siloxane—Polyurethane Coatings, *J. Comb. Chem.*, vol. 9, No. 1, 2007 (pp. 178-188).

Ekin et al., "Synthesis, formulation, and characterization of siloxane-polyurethane coatings for underwater marine applications using combinatorial high-throughput experimentation," *J. Coat. Technol. Res.*, vol. 4, No. 4, 2007 (pp. 435-451).

Ekin et al., "Library Synthesis and Characterization of 3-Aminopropyl-Terminated Poly(dimethylsiloxane)s and Poly(ε-caprolactone)-b-Poly(dimethylsiloxane)s," *Journal of Polymer Science: Part A: Polymer Chemistry*, vol. 44, 2006 (pp. 4880-4894).

Ekin et al., "Synthesis and Characterization of Novel Hydroxyalkyl Carbamate and Dihydroxyalkyl Carbamate Terminated Poly(dimethylsiloxane) Oligomers and Their Block Copolymers with Poly(ε-caprolactone)," *Macromolecules*, vol. 39, No. 25, 2006 (pp. 8659-8668).

Holohan et al., "Monofunctional polydimethylsiloxane oligomers for graft copolymerization", *Macromol. Chem. Phys.*, vol. 195, No. 9, 1994 (pp. 2965-2979).

Kawakami et al., "Silicone Macromers for Graft Polymer Synthesis", *Polymer Journal*, vol. 14, No. 11, 1982 (pp. 913-917).

Majumdar et al., "Thermoset Siloxane-Urethane Fouling Release Coatings," *A.C.S. Symposium Series*, vol. 957, 2007, (pp. 61-75).

Majumdar et al., "Preparation of Siloxane-Urethane Coatings Having Spontaneously Formed Stable Biphasic Microtopographical Surfaces," *Macromolecules*, vol. 38, No. 14, 2005 (pp. 5857-5859).

Pieper et al., "Combinatorial approach to study the effect of acrylic polyol composition on the properties of crosslinked siloxane-polyurethane fouling-release coatings," *J. Coat. Technol. Res.*, vol. 4, No. 4, 2007 (pp. 453-461).

Stafslien et al., "Combinatorial materials research applied to the development of new surface coatings IV. A high-throughput bacterial biofilm retention and retraction assay for screening fouling-release performance of coatings," *Biofouling*, vol. 23, No. 1, 2007 (pp. 45-54).

PCT International Search Report relating to International Application No. PCT/US2008/066306, date of mailing of the International Search Report Jul. 16, 2009 (2 pgs.).

Dou, et al., PDMS-Modified Polyurethane Films with Low Water Contact Angle Hysteresis, Macromolecular Chemistry and Physics, vol. 207, pp. 2170-2179 (2006).

Supplementary European Search Report for Euro. Pat. Appln. EP 08 82 7872.6, 3 pages, (2012).

ANCHORED POLYSILOXANE-MODIFIED POLYURETHANE COATINGS AND USES THEREOF

CROSS-REFERENCE TO RELATED APPLICATIONS

The present application is a U.S. national stage of and claims priority to and the benefit of International Application No. PCT/US2008/066306, entitled "Anchored Polysiloxane-Modified Polyurethane Coatings and Uses Thereof," filed Jun. 9, 2008, which claims the benefit of U.S. Provisional Application Ser. No. 60/934,093, entitled Anchored Polysiloxane-Modified Polyurethane Coatings and Uses Thereof, filed Jun. 11, 2007, and U.S. Provisional Application Ser. No. 60/997,156, entitled Anchored Polysiloxane-Modified Polyurethane Coatings and Uses Thereof, filed Oct. 1, 2007, the specification, drawings, claims and abstract of each of which are incorporated herein by reference in their entirety.

GOVERNMENT RIGHTS STATEMENT

This invention was made with government support under Grant No. N00014-06-1-0952 awarded by the Department of Defense, Office of Naval Research. The government has certain rights in the invention.

BACKGROUND

Fouling of ship hulls by marine organisms has plagued shipping activities for millennia. Fouling presents a significant drag penalty, reducing the efficiency of propulsion and resulting in the expenditure of excess fuel to overcome the drag in order to meet target cruising speed. Fouling also results in the transport of organisms from foreign ecosystems and can result in the introduction of invasive species. Thus, from both an operational and ecological point of view, methods to reduce or eliminate fouling are necessary. Biological fouling of marine organisms on ships has serious consequences for ship performance and mission capability. Fouling results in a rougher surface and an increase in the overall drag of the ship. These may result in substantial increases in fuel consumption and overall voyage cost.

Fouling release ("FR") coatings appear to be a leading non-toxic alternative to biocide containing coatings. These are coating systems that do not necessarily prevent the settlement of marine organisms, but permit their easy removal with the application of shear to the surface of the coating. Ideally, the hydrodynamic shear on the hull as a ship reaches cruising velocity would be sufficient to remove fouling organisms. Coatings that are also easily cleaned using a water jet are, however, also desired. The most successful of such coatings to date are based on silicone elastomers. It has been shown that coatings with low modulus and low surface energy can often provide easy release of fouling organisms. Due to their low modulus, however, these coatings are very often easily damaged. In addition, such fouling release coatings may also suffer from poor adhesion, poor durability, and high cost.

SUMMARY

The present application is directed to a polymeric material which may be used to form fouling release coatings, e.g., for use in protecting boat hulls. The polymeric material may be prepared by reacting a mixture comprising: polyisocyanate; polyol; and polysiloxane having functional groups capable of reacting with the polyisocyanate. The polysiloxane component may have one or more functional groups capable of reacting with the polyisocyanate, where the isocyanate-reactive functional groups are attached to only a single end of the polyorganosiloxane chain(s). For example, the polysiloxane component may be an amino functional polyorganosiloxane, having one or more amino groups attached to a single end of the polyorganosiloxane chain.

The polymeric material may be used to form coatings which may have an initial water contact angle of at least about 90°. In some embodiments, the polymeric material may commonly have an initial water contact angle of at least about 100°, suitably may have an initial water contact angle of at least about 105°, and desirably may have an initial water contact angle of at least about 110°. In some embodiments, the water contact angle may change by no more than about 20° after immersion of the coating in deionized water for 30 days. In some embodiments, the water contact angle may suitably change by no more than about 10°, and desirably the water contact angle may change by no more than about 5° after immersion of the coating in deionized water for 30 days. In some embodiments, the polymeric material may be used to form a coating on a substrate which desirably has an initial pseudobarnacle pull off adhesion release force of no more than about 80N.

The polysiloxane components employed to form the present polymeric materials typically include polyorganosiloxane chain(s) which have a number average molecular weight of at least about 500. In some embodiments, the polyorganosiloxane may commonly have a number average molecular weight of at least about 1,000. In some embodiments, the polyorganosiloxane may desirably have a number average molecular weight of at least about 10,000.

In some embodiments, suitable polymeric materials may include those prepared by reacting a mixture comprising: an amino functional polyorganosiloxane (e.g., having a number average molecular weight of about 1,000 to 5,000); polyisocyanate; and polyol, such as a polycaprolactone polyol and/or a hydroxy-functional poly(meth)acrylate. In some embodiments, suitable polymeric materials may include those prepared by reacting a mixture comprising: an amino functional polyorganosiloxane (e.g., having a number average molecular weight of about 5,000 to 15,000); polyisocyanate; and polyol, such as a polycaprolactone polyol and/or a hydroxy-functional poly(meth)acrylate.

In one embodiment of the present application, crosslinked poly(dimethylsiloxane)-modified polyurethane coatings are described. Such coating can be formed from a mixture comprising the following components:

1. An organofunctional polysiloxane, such as poly(dimethylsiloxane) ("PDMS"), where the polysiloxane has one or more amino groups attached, typically via a linkage group, to a single end of the polymer chain;
2. an organic polyol, which can include a polyester, polyether, and/or acrylic polyol;
3. a polyisocyanate;
4. a catalyst to effect cure;
5. an optional pot-life extender; and
6. typically, one or more organic solvents.

In another embodiment of the present application, crosslinked polyorganosiloxane-modified polyurethane coatings may be formed from a mixture comprising: polyisocyanate; polyol; and polyorganosiloxane. The polyorganosiloxane may have one or more hydroxyalkyl carbamate groups attached, typically via a linkage group, to only a single end of the polymer chain. In certain embodiment, the polyorganosiloxane may include hydroxyl alkyl carbamate groups which include two or more hydroxy groups.

In other embodiments, crosslinked polyorganosiloxane-modified polyurethane coatings can be formed from a mixture comprising: polyisocyanate; polyol; and "star" polyorganosiloxane. For example, the "star" polyorganosiloxane may be prepared by reaction of a silane-terminated PDMS with a multifunctional reagent to form a molecule including one or more isocyanate-reactive functional group attached (e.g., via a linking group) to two or more PDMS polymer chains. The linking group may be a branched chain alkylene group, may include a hydroxyalkyl carbamate group and/or may include alkylene ether linkages. In some embodiments, the multifunctional reagent may comprise pentaerythritol triallyl ether, pentaerythritol diallyl ether and/or trimethylolpropane diallyl ether. Other suitable multifunctional reagents include partial allyl ethers of sorbitol or other similar polyols, e.g., reagents such as sorbitol di-, tri- or tetraallyl ethers.

The formation of crosslinked polyurethane coatings is well known in the literature and crosslinked polyurethane coatings are commonly formed from a mixture which includes an organic polyol and a polyisocyanate. Catalyst, pot life extender and/or solvents may also be included in formulations used to produce the present polymeric materials and coatings.

The organic polyols employed to form the present polymeric materials can be any polyol typically used to form crosslinked coatings. These can include polyester polyols, polyether polyols, polycarbonate polyols and acrylic polyols. A mixture of polyols can also be used in formulating a polyurethane coating. Polyester polyols can include those made from the melt polycondensation of polyfunctional acids with polyfunctional alcohols or those made from the ring opening polymerization of cyclic monomers such as epsilon-caprolactone. Acrylic polyols are typically made from the free radical polymerization of a mixture of ethylenically unsaturated monomers. One of the monomers must bear a hydroxyl functional group. Hydroxy-functional monomers include hydroxyethyl acrylate, hydroxyethylmethacrylate, hydroxypropyl acrylate, and hydroxypropyl methacrylate.

In other embodiments, the present polymeric material may be prepared by reacting a mixture comprising: polyisocyanate; polyol; and a polysiloxane component having two or more polyorganosiloxane chains attached to a linker molecule, which has one or more functional groups capable of reacting with the polyisocyanate. For example, the polysiloxane component may have formula I:

(I)

where R'Si— is a terminal group; n is about 10 to 1,000; LINK is a linking group; X is —OH or —NH$_2$; and y is an integer from 1 to 4. Examples of suitable linking groups ("LINK") include alkylene groups, which may have one or more oxygen, nitrogen or sulfur atoms substituted for a carbon atom of its backbone. Typically, the linking group has no more than about 10 atoms in its backbone. Suitable R'Si— terminal groups may be trialkylsilyl groups, such as R$_3$Si— groups, e.g., Me$_3$Si—, or R$^1$R$_2$Si— groups, e.g., BuMe$_2$Si—.

In other embodiments, the present polymeric material may be prepared by reacting a mixture comprising: polyisocyanate; polyorganosiloxane having two or more functional groups capable of reacting with the polyisocyanate attached to only a single end of the polyorganosiloxane; and polyol. The polyorganosiloxane typically has (a) two or more amino groups or (b) two or more hydroxy groups attached to only a single end of the polyorganosiloxane.

Methods of inhibiting fouling on a surface exposed to aquatic conditions, such as a boat hull, comprising applying a fouling release coating composition to at least a portion of said surface hull are also provided. The application also describes surfaces designed to be exposed to aqueous conditions (e.g., salt water conditions, such as seawater or brackish water, or fresh water conditions, such as found with materials in contact with lake or stream water), which are protected with a coating including the polymeric materials described in the present application.

By synthesizing polysiloxane-modified (e.g., PDMS-modified) polyurethane coatings, it can be possible to generate coatings that have low surface energy surfaces, where the surfaces maintain low surface energy under water due to the crosslinking. The coatings may also be tough and have good adhesion to various substrates. The components can be mixed together and the applied to the substrate where the solvent evaporates and crosslinking takes place. Due to the low surface energy of the polysiloxane, this component may tend to preferentially rise to the surface of the coating. However, due to the isocyanate-reactive functional end group(s), e.g., amino-functional end group(s), the polysiloxane can react with isocyanate functional groups and become anchored to the polymer network.

DETAILED DESCRIPTION

To provide coatings that exhibit fouling release behavior while also yielding improved durability, self-stratifying coatings that phase separate into a low surface energy, low modulus top layer, with a tougher lower layer can be designed. Self-stratifying coatings are coatings that are applied in a single step, but then spontaneously phase separate into two or more distinct layers upon application and film formation. Surface energy and viscosity are the main driving and/or controlling forces for self-stratification. A coating composed of polymeric material with poly(dialkylsiloxane) (e.g., poly (dimethylsiloxane); "PDMS") and polyurethane subunits may meet these requirements. Since surface energy is a primary driving force, the PDMS component will form the top, low energy, rubbery layer. The polyurethane component can form a tough durable underlayer. An additional advantage of this system is that the isocyanate resins used to form the polyurethane may react with residual hydroxyl groups on an epoxy anticorrosion primer, providing good adhesion, thus eliminating the need for a tie layer between the corrosion coating and the fouling-release coating.

Figure 1:
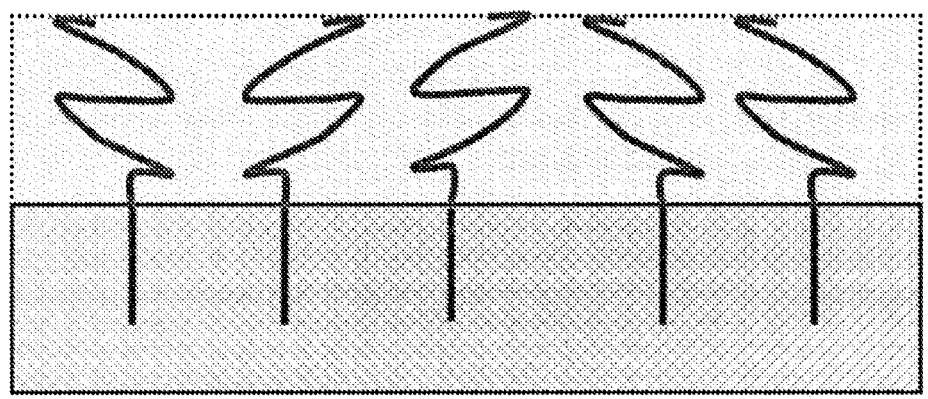
FIG. 1 depicts a cross section of an anchored polysiloxane coating formed using the present method, wherein the coating includes a mono-functional polysiloxane, such as a mono amino functional PDMS, anchored in a polyurethane matrix.
Figure 2:
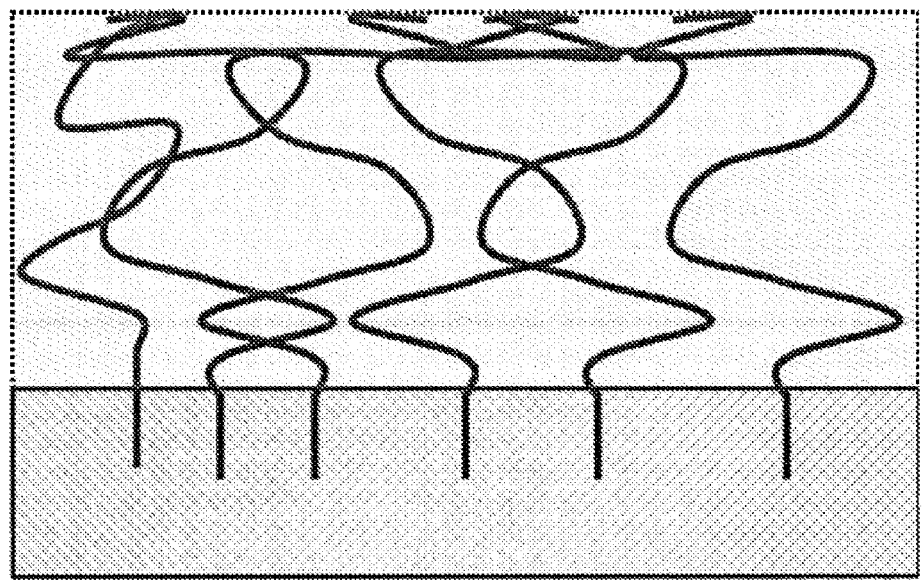
FIG. 2 depicts a cross section of an anchored polysiloxane coating as in FIG. 1, wherein the PDMS molecular weight is higher than the PDMS molecular weight in FIG. 1.

The preparation of siloxane-polyurethane coatings can be carried out using PDMS polymers that have organofunctional groups at one end of the polymer chain. One or more amino functional groups can be present at the chain end. In many reported siloxane-polyurethane coatings, both ends of the PDMS chain are tethered to the coating and can potentially restrict the mobility of the PDMS segments on the surface of the coating. Coatings that have a polysiloxane, such as PDMS, tethered at only one end, can result in a highly mobile surface and may permit easier release of fouling organisms as illustrated in FIGS. 1 and 2.

Monofunctional PDMS polymers can be synthesized through the anionic ring-opening polymerization of hexamethylcyclotrisiloxane ("D3"), a cyclic siloxane trimer, using an anionic initiator (see, e.g., Scheme 1). The PDMS chain can be terminated, e.g., using dimethyl chlorosilane, followed by hydrosilation to convert the chain end to the desired functional group.

Target Structures: 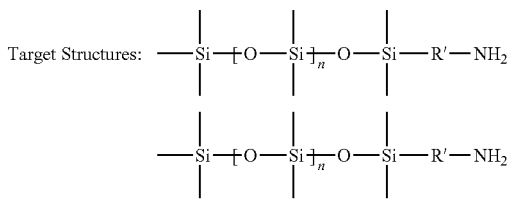

The synthetic scheme for the synthesis of aminopropyl terminated PDMS is shown in Scheme 2. The molecular weight of the PDMS can be readily varied by changing the ratio of the D3 to the lithium trimethylsiloxanoate initiator. Polysiloxanes having molecular weights from 500 to 30,000 g/mol can be readily prepared using this type of method. The amount of PDMS incorporated into the siloxane-polyurethane coating system can be varied, e.g., from about 0.1 weight percent up to 30 weight percent. The amount of PDMS incorporated into the siloxane-polyurethane coating system can be varied from 0.1 weight percent up to 30 weight percent. Siloxane-polyurethane coating system incorporating about 0.5 to 10 wt. % PDMS are quite suitable for many coating applications.

Scheme 1. General synthesis of single end functional PDMS.

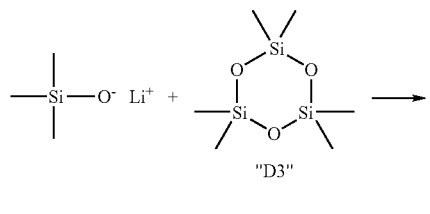

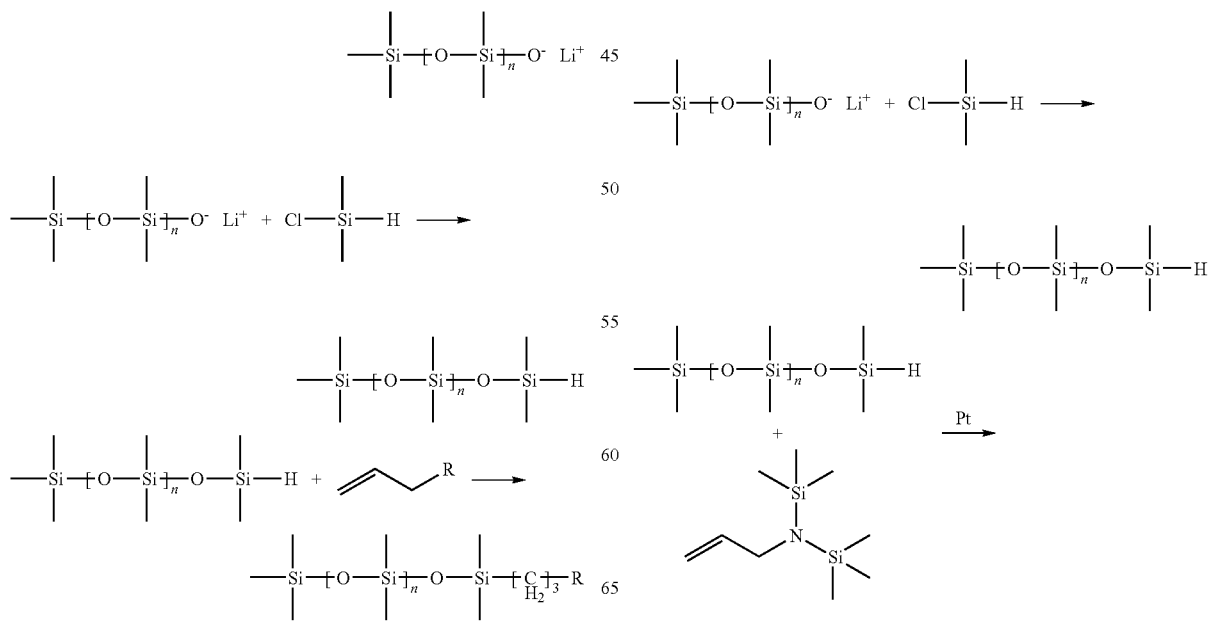

Scheme 2. Synthesis scheme for mono-aminopropyl terminated PDMS.

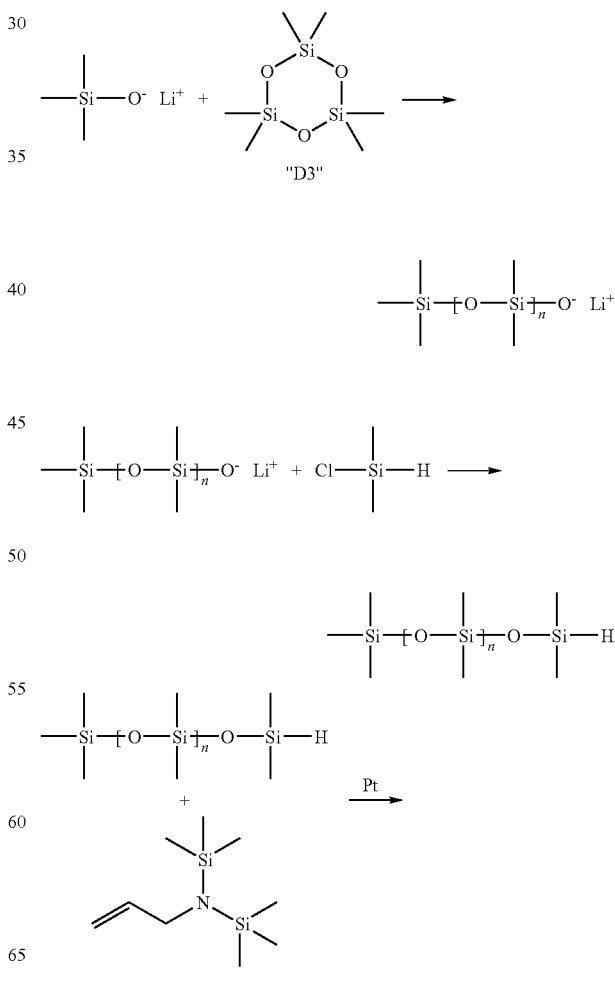

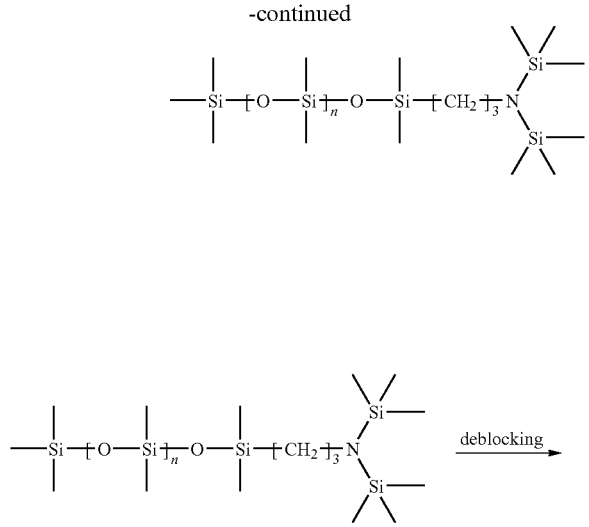

Suitable anionic initiators can include lithium trimethylsiloxanoate, n-butyl lithium and the like.

An additional advantage of using the mono-terminated PDMS is that it can be pre-reacted with the isocyanate crosslinker without gelation to form an adduct. This adduct can then be mixed with the organic polyol just prior to application to a surface to form a coating.

Several aminopropyl monoterminated PDMS were synthesized having a range of molecular weights from 2,000 to 30,000 (theoretical). These aminopropyl monoterminated PDMS were incorporated into a siloxane-polyurethane coating formulation containing a polycaprolactone polyol (Tone 0305 from Dow Chemical), and a polyisocyanate based on isophorone diisocyanate (IDT70B from Rhodia). The catalyst used was dibutyl tin diacetate ("DBTDA"). Coatings were prepared using 5 and 10% of the mono-amino functional PDMS. Coatings were tested for pseudobarnacle adhesion and surface energy initially as-made and after immersion in deionized water for 30 days. A siloxane-polyurethane coating incorporating the mono-aminopropyl terminated PDMS had low surface energy and very low pseudobarnacle adhesion. The data are shown in Table 1 and 2, below.

TABLE 1

Pseudobarnacle adhesion of siloxane-polyurethane coatings.

| | 10% PDMS | | 5% PDMS | |
|---|---|---|---|---|
| Theoretical MW (g/mol) | Before Water Immersion (N) | After Water Immersion (N) | Before Water Immersion (N) | After Water Immersion (N) |
| 30,000 | 8.75 | 8.17 | Not Prepared | |
| 5,000 | 8.20 | — | 9.60 | — |
| 2,000 | 8.71 | 8.49 | 8.60 | 8.53 |
| 5,000 | 8.76 | 8.46 | 8.81 | 8.53 |
| 3,000 | 8.66 | — | 8.70 | — |

TABLE 2

Contact angle and surface energy data for siloxane-polyurethane coatings.

| | 10% PDMS | | | | | | 5% PDMS | | | | | |
|---|---|---|---|---|---|---|---|---|---|---|---|---|
| | Before Water Immersion | | | After Water Immersion | | | Before Water Immersion | | | After Water Immersion | | |
| Theoretical MW (g/mol) | Water CA | M.I. CA | Surface Energy (mN/m) | Water CA | M.I. CA | Surface Energy (mN/m) | Water CA | M.I. CA | Surface Energy (mN/m) | Water CA | M.I. CA | Surface Energy (mN/m) |
| 30,000 | 107.8 | 74.2 | 20.9 | 103.6 | 78.4 | 19.6 | Not Prepared | | | | | |
| 5,000 | 106.5 | 73.3 | 21.5 | — | | | 107.0 | 73.7 | 21.2 | — | | |
| 2,000 | 104.1 | 71.0 | 22.9 | 107.1 | 78.3 | 19.0 | 106.0 | 70.5 | 22.9 | 98.2 | 76.3 | 21.7 |
| 5,000 | 107.4 | 72.6 | 21.8 | 100.8 | 76.5 | 20.9 | 106.7 | 71.3 | 22.5 | 98.9 | 75.0 | 22.0 |
| 3,000 | 105.7 | 69.0 | 23.7 | — | | | 101.8 | 69.8 | 23.8 | — | | |

Other unique modified polysiloxane structures can be prepared by reacting an aminopropyl mono-terminated PDMS with a cyclic carbonate such as ethylene carbonate, propylene carbonate, or glycerin carbonate (see Scheme 3). Reaction with ethylene carbonate or propylene carbonate results in a hydroxyl alkyl carbamate mono-terminated polysiloxane.

Reaction with glycerin carbonate results in a dihydroxy alkyl carbamate mono-terminated PDMS. This PDMS polymer has two reactive functional groups (the hydroxyls) at one end of the polymer chain. As above, use of this functionalized polysiloxane could result in a highly mobile surface, providing low surface energy and low adhesion of fouling organisms, however, it can be incorporated into a cross linked polymer network quite differently than the siloxane polymers having a single functional chain. Reaction with ethylene carbonate or propylene carbonate results in a hydroxyl alkyl carbamate mono-terminated PDMS.

Scheme 3. Synthesis of hydroxyl alkyl carbamate mono-terminated PDMS and dihydroxy alkyl carbamate mono-terminated PDMS

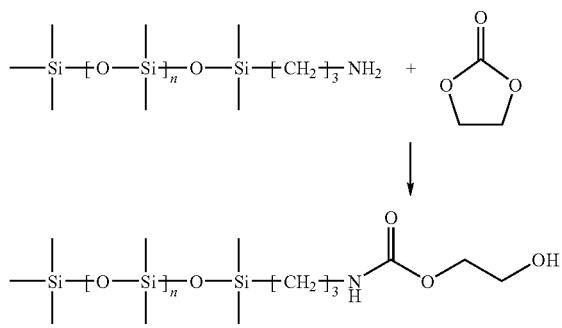

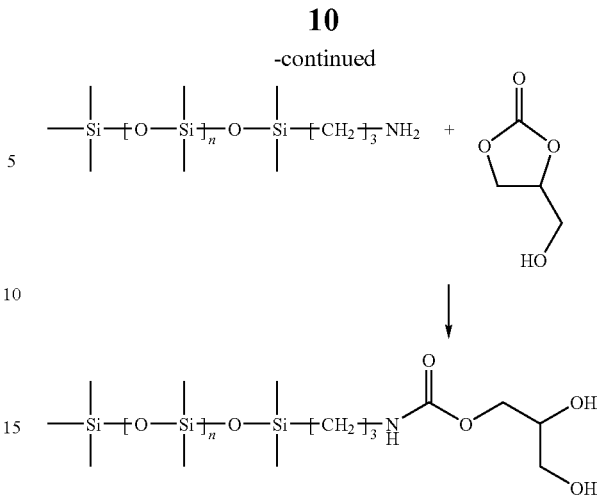

Figure 3:
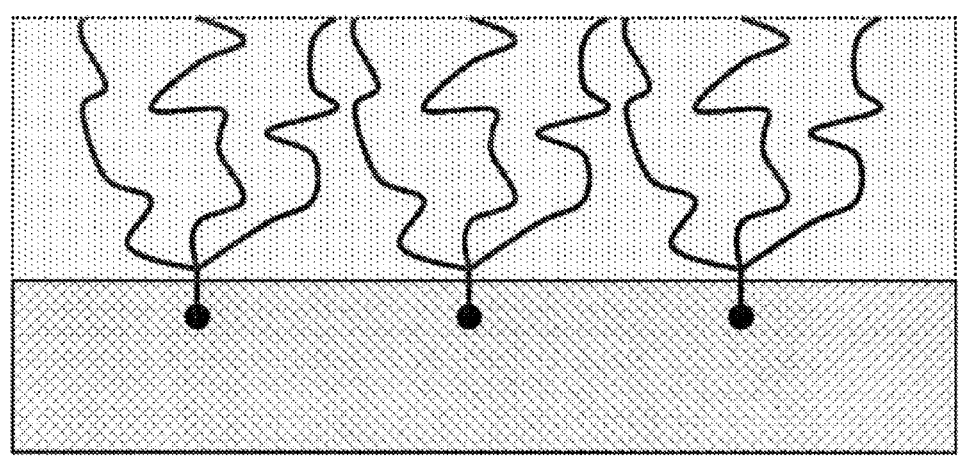
FIG. 3 depicts a siloxane-polyurethane coating made from monofunctional "star" PDMS.

Additional architectures of the PDMS polymer are also possible using the synthetic strategy shown in Scheme 2. For example, the silane terminated PDMS can be reacted with a multifunctional reagent such as pentaerythritol triallyl ether to yield a hydroxyl-functional PDMS "star", as shown in Scheme 4. When incorporated into a polyurethane coating, this architecture has the potential to yield a highly mobile PDMS surface due to the branched structure of the PDMS. A model for the possible morphology of a siloxane-polyurethane coating made from this "star" PDMS is shown in FIG. 3.

Scheme 4. Synthesis of monofunctional "star" PDMS.

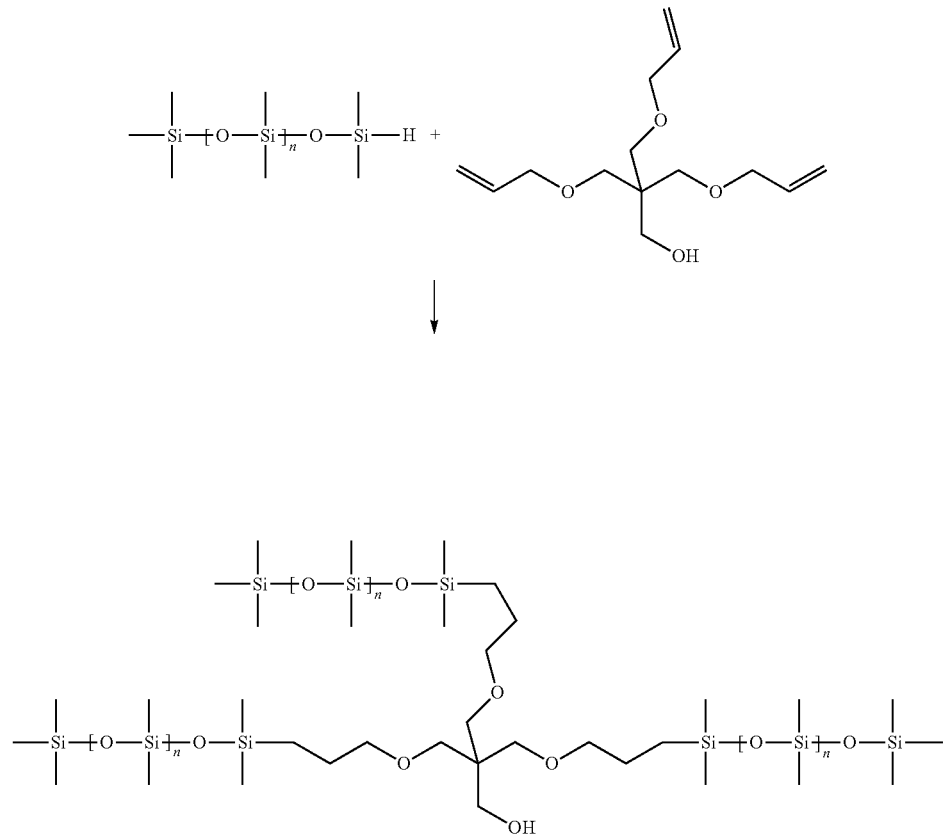

A similar material can also be synthesized from trimethylolpropane diallyl ether and is illustrated in Scheme 5. This is a unique polymer in that it has a single isocyanate reactive functional group in the middle of a PDMS polymer.

To form the siloxane-polyurethane coatings from these polymers, the siloxane is typically combined with an additional organic polyol plus a polyisocyanate. Optionally, a catalyst may be present to accelerate the curing and solvents may also be used. In addition, a pot life extender may be used in the coating formulation.

The organic polyol may be a polyether polyol, such as poly(ethyleneglycol), poly(propylene glycol), poly(butylene glycol) or poly(tetramethylene oxide); a polycarbonate polyol, a polyester polyol, or an acrylic polyol. Examples of suitable polyester polyols are poly(caprolactone) polyols or poly(hexamethylene adipate) and the like.

minum such as K-Kat 4205, K-Kat-5218, and K-Kat-XC-6212. Examples of organic base catalysts are sold under the DABCO trade name by Air Products. DABCO is 1,4-diazabicyclo[2.2.2]octane.

Solvents used in the formulation can be solvents typical of that used in coatings systems. These can include toluene, xylene, methyl ethyl ketone, methyl amyl ketone, methyl isobutyl ketone, butyl acetate, t-butyl acetate, ethyl ethoxy propioniate, isopropanol and the like.

Pot life extenders can include volatile compounds that inhibit the curing reaction such as 2-4-pentanedione.

Pigments can be included in the formulation if a coating having a particular color is desired.

The siloxane-polyurethane coatings may commonly have an initial water contact angle of at least about 90°, suitably of at least about 100°, more suitably of at least about 105°, and Scheme 5. Synthesis of functional PDMS.

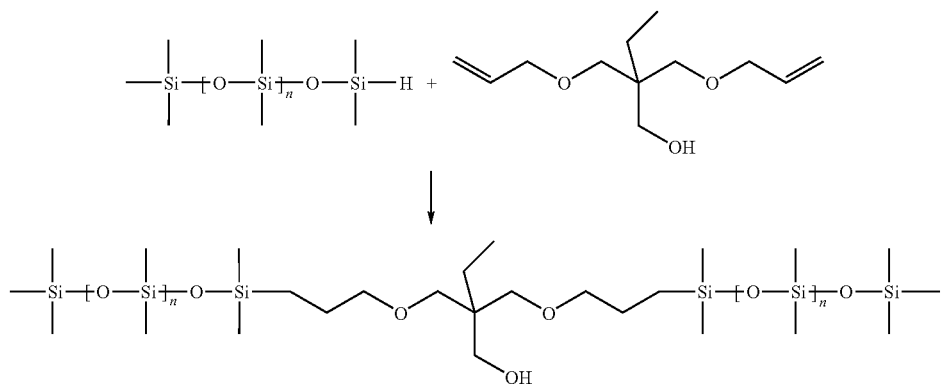

Acrylic polyols may be synthesized from a mixture of at least one hydroxy functional monomer plus one or more non-functional monomers. Suitable hydroxy functional monomers are hydroxyethyl acrylate, hydroxyethyl methacrylate, hydroxypropyl acrylate, hydroxypropyl methacrylate and the like. Examples of non-functional monomers are styrene, methyl methacrylate, methyl acrylate, butyl methacrylate, butyl acrylate, lauryl methacrylate, lauryl acrylate, 2-ethylhexyl acrylate, 2-ethyl hexyl methacrylate and the like. The acrylic polyol is synthesized in solution using a thermally-activated free radical initiator. The polyol can be synthesized in either a batch, semi-batch or continuous process. Examples of free radical initiators are benzoyl peroxide, t-amyl peroxy-2-ethylhexanoate, t-butyl hydroperoxide, di-t-butyl peroxide, azobisisobutyronitrile, azobisisovaleronitrile, and the like.

Solvents for the acrylic polyol polymerization can be toluene, xylene, methylisobutyl ketone, etc. The polymerization is conducted at a temperature suitable to effect polymerization in a reasonable period of time and is dependent on the initiator used. Polymerization can be carried out in the range of 70° C. to 180° C.

The polyisocyanate used in the invention can be either aromatic or aliphatic, or cycloaliphatic. Polyisocyanates based on methylene diphenyl diisocyanate ("MDI"), hexamethylene diisocyanate, isophorone diisocyanate, and the like can be used.

Catalysts for the crosslinking can be either organometallic complexes or organic bases. Examples of organometallic compounds are dibutyl tin dilaurate, dibutyl tin diacetate, bismuth carboxylate, and compounds of zirconium and aludesirably of at least about 110°. The water contact angle may commonly change after immersion of the polymeric material in deionized water for 30 days no more than about 20°, suitably no more than about 10°, and desirably no more than about 5°. The polymeric material may commonly have an initial pseudobarnacle pull off adhesion release force of no more than about 80N.

EXAMPLES

The following examples are presented to illustrate the compositions and methods described herein, and to assist one of ordinary skill in making and using the same. The examples are not intended in any way to otherwise limit the scope of the invention.

Example 1

Synthesis of Aminopropyl Terminated PDMS and Use in Coatings

Synthesis of APT-PDMS-M

Synthesis of the monofunctional aminopropyl terminated oligomer ("APT-PDMS-M") is carried out in two steps. In the first step, anionic polymerization is carried out to synthesize a silane-terminated macromer. Then, the macromer is functionalized through hydrosilation with protected allyl amine (see Scheme 2).

Macromer Synthesis

Hexamethylcyclotrisiloxane ("D3") was dissolved in tetrahydrofuran ("THF") at a concentration of 50 wt %. The solution was degassed by bubbling nitrogen ("N$_2$") gas through it. Lithium trimethylsilanolate ("LTMS") salt was added to the solution to initiate polymerization at room temperature. The amount of LTMS added was varied in molar ratios to D3 to achieve four molecular weights (1,000, 5,000, 10,000, and 15,000 g/mol). After 24 hours of reaction time, the living polymerization was terminated by the addition of diemthylchlorosilane ("CDMS") at 2-5° C. The terminating agent, CDMS, was added in excess (100% molar) to ensure termination of all "living" polymer chain ends. Table 3 summarizes the amounts of D3 monomer solution, LTMS initiator, and CDMS terminating agent that were used for the polymerization and termination. The solutions were filtered to remove THF and a lithium chloride ("LiCl") salt precipitate formed, causing the polymer to appear cloudy. The LiCl precipitate was removed by vacuum filtration to yield a clear, monohydride terminated poly(dimethyl siloxane) ("PDMS") macromer ("HT-PDMS-M"). The synthetic procedure for the PDMS macromer synthesis is shown in Scheme 6.

TABLE 3

Amount of D3 and LTMS used to polymerize PDMS macromers of various molecular weights.

| Theoretical MW (g/mol) | D3 Soln* (g) | D3 Mass (g) | D3 mMoles | LTMS Mass (g) | LTMS mMoles | CDMS Mass (g) | CDMS mMoles |
|---|---|---|---|---|---|---|---|
| 1,000 | 100.0 | 50.0 | 220 | 4.87 | 50.8 | 9.6 | 101.5 |
| 5,000 | 100.0 | 50.0 | 220 | 0.96 | 10.0 | 1.9 | 20.1 |
| 10,000 | 100.0 | 50.0 | 220 | 0.48 | 5.0 | 0.9 | 9.9 |
| 15,000 | 100.0 | 50.0 | 220 | 0.32 | 3.3 | 0.6 | 6.7 |

*50% wt solution in THF

Scheme 6: Synthetic procedure for the preparation of hydride terminated PDMS macromers using living anionic polymerization and controlled termination with a chlorosilane.

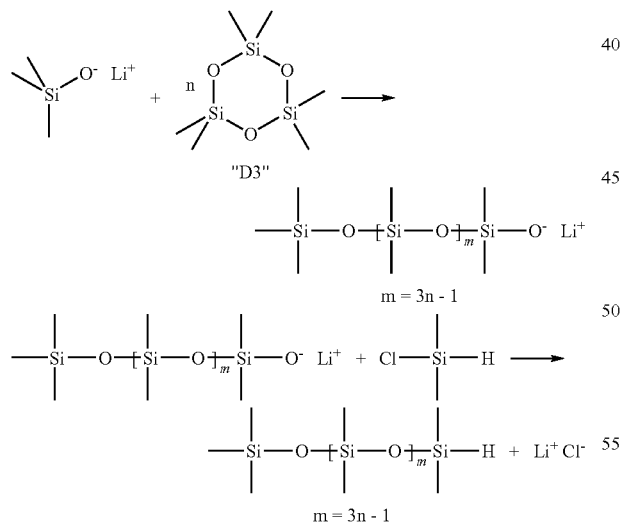

Macromer Functionalization

A protected allylamine, N-Allyl-N,N-bis(trimethylsilyl)amine ("Allyl-HMDS"), was added to the HT-PDMS-M. Hydrosilylation was carried out at 60° C. in the presence of Karstedt catalyst (Platinum(0)-1,3-divinyl-1,1,3,3-tetramethyldisiloxane complex) of which 1 drop of solution in xylene had been added. Table 4 summarizes the reaction times and reagents used to carry out the hydrosilylation reactions. The products of the hydrosilylation reactions were called disilazane terminated PDMS macromers ("DT-PDMS-M"). The primary amine groups of the DT-PDMS-M were then deprotected by washing with methanol (30 mL) to yield aminopropyl terminated PDMS macromers ("APT-PDMS-M"). The synthetic procedure for functionalization of the PDMS macromers is shown in Scheme 7.

TABLE 4

Reaction times and reagent amounts used for hydrosilylation reactions

| Theoretical MW (g/mol) | HT-PDMS-M (g) | Allyl-HMDS Mass (g) | Allyl-HMDS mMoles | Reaction time (hrs) |
|---|---|---|---|---|
| 1,000 | 33.3 | 12.5 | 62.0 | 22 |
| 5,000 | 38.5 | 5.3 | 26.3 | 22 |
| 10,000 | 39.2 | 2.4 | 11.9 | 22 |
| 15,000 | 39.5 | 2.0 | 9.9 | 22 |

Scheme 7: Synthetic procedure for the functionalization of hydride terminated PDMS macromers and deprotection to yield APT-PDMS-M.

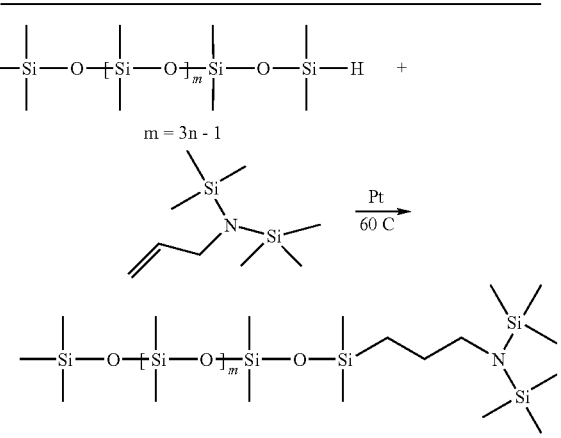

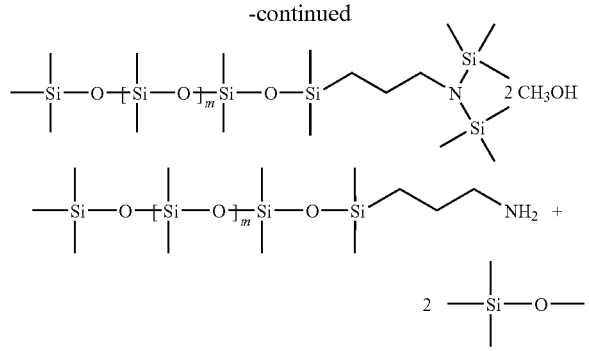

Characterization of PDMS Macromers

The HT-PDMS-M were characterized using gel permeation chromatography ("GPC"), to confirm the molecular weight of the macromers. The number average molecular weight ("MW"), weight average MW, and polydispersity index ("PDI") obtained from GPC analysis, relative to polystyrene standards, are shown in Table 5.

TABLE 5

Molecular weight data for HT-PDMS-M.

| Theoretical MW (g/mol) | Number average MW | Weight average MW | PDI |
|---|---|---|---|
| 1,000 | 2,200 | 2,500 | 1.17 |
| 5,000 | 6,700 | 8,700 | 1.3 |
| 10,000 | 11,300 | 15,500 | 1.38 |
| 15,000 | 12,100 | 16,700 | 1.38 | solutions for formulation purposes while Tolonate IDT 70B was used as supplied (70% in BA). The coatings were formulated with a 1.1:1 ratio of isocyanate to hydroxyl and amine equivalents. The coating formulations are outlined in Table 6 with reagent quantities for approximately 10 grams of total formulation. The coating formulations were prepared by first mixing the APT-PDMS-M solutions with IDT for 1 hour. The PD was added and the formulation was mixed. The addition of PCL polyol and DBTDAc solutions followed in that order. The compositions of the coating formulations are summarized in Table 7.

TABLE 6

PU-PDMS coating formulation recipes

| Coating ID | Theoretical MW PDMS (g/mol) | 30% PDMS in EEP (g) | Tolonate IDT 70B (g) | 90% PCL polyol in MAK (g) | 1% DBTDAc in MAK |
|---|---|---|---|---|---|
| 1 | 1,000 | 1.08 | 5.98 | 2.21 | 0.10 |
| 2 | 1,000 | 2.16 | 5.68 | 2.08 | 0.10 |
| 3 | 5,000 | 1.08 | 5.98 | 2.21 | 0.10 |
| 4 | 5,000 | 2.16 | 5.68 | 2.08 | 0.10 |
| 5 | 10,000 | 1.08 | 5.98 | 2.21 | 0.10 |
| 6 | 10,000 | 2.16 | 5.68 | 2.08 | 0.10 |
| 7 | 15,000 | 1.08 | 5.98 | 2.21 | 0.10 |
| 8 | 15,000 | 2.16 | 5.68 | 2.08 | 0.10 |
| 9 (PU) | NA | 0.00 | 6.29 | 2.33 | 0.10 |

TABLE 7

Coating formulation composition of PU-PDMS coatings used to prepare coatings for bioassay testing

| Coating ID | Theoretical MW PDMS (g/mol) | Weight % of Solids | | | | DBTDAc (% total solids) | Weight % of Solvent | | | PD (based on total formulation) |
|---|---|---|---|---|---|---|---|---|---|---|
| | | PDMS | IDT | PCL polyol | Total Solids | | BA | EEP | MAK | |
| 1 | 1,000 | 5% | 64% | 31% | 69% | 0.015% | 63% | 26% | 11% | 10% |
| 2 | 1,000 | 10% | 61% | 29% | 65% | 0.015% | 48% | 43% | 9% | 10% |
| 3 | 5,000 | 5% | 64% | 31% | 69% | 0.015% | 63% | 26% | 11% | 10% |
| 4 | 5,000 | 10% | 61% | 29% | 65% | 0.015% | 48% | 43% | 9% | 10% |
| 5 | 10,000 | 5% | 64% | 31% | 69% | 0.015% | 63% | 26% | 11% | 10% |
| 6 | 10,000 | 10% | 61% | 29% | 65% | 0.015% | 48% | 43% | 9% | 10% |
| 7 | 15,000 | 5% | 64% | 31% | 69% | 0.015% | 63% | 26% | 11% | 10% |
| 8 | 15,000 | 10% | 61% | 29% | 65% | 0.015% | 48% | 43% | 9% | 10% |
| 9 (PU) | NA | 0% | 68% | 32% | 75% | 0.015% | 85% | 0% | 15% | 10% |

Coating Formulation

Polyurethane ("PU")-PDMS coating formulations were prepared using the APT-PDMS-M, isophorone diisocyanate trimer ("IDT", 70% in butyl acetate ("BA"), Tolonate IDT 70B), a polycaprolactone polyol ("PCL", Tone polyol 0305), dibutyltin diacetate ("DBTDAc") as a catalyst, 2,4-pentanedione ("PD") as a pot-life extender and methyl amyl ketone ("MAK") and ethyl 3-ethoxypropionate ("EEP") as solvents. The APT-PDMS-Ms (30% in EEP), PCL polyol (90% in MAK) and DBTDAc (1% in MAK) were used as Coating Preparation The coatings were prepared by drawdown (10 mil wet thickness) onto 4"×8" aluminum Q-panels in an array format using an automated coating application instrument (Symyx). The coatings were also manually dispensed into 24-well microtiter plates with primed aluminum discs adhered at the base of each well using a repeat volume pipettor (250 μL per well). The coatings were cured at ambient conditions overnight and then oven cured at 80° C. for 45 minutes the following morning. Silicone controls coatings, DC 3140 and T2

Silastic, were prepared in the same way, but curing was performed at ambient conditions for 24 hours and the samples were not oven cured.

Pseudobarnacle Adhesion

Pseudobarnacle adhesion ("PB") was performed on the coatings approximately 20 hours after initial attachment of the test studs. This test was performed before and after 21 days of water immersion. The results from this test are outlined in Table 8. The values reported are averages of three measurements, unless otherwise noted. Overall, the siloxane-polyurethane coatings showed very low PB adhesion, showing removal forces much lower than the polyurethane without siloxane and also lower than the silicone controls. The results for the siloxane-polyurethane coatings are also similar before and after water immersion, indicating that the coatings are stable under water.

Contact Angle and Surface Energy

Contact angle ("CA") measurements were performed on coatings on 4"×8" aluminum panels using water and methylene iodide ("MeI") before and after 21 days of water immersion. Table 9 summarizes the water and MeI contact angles, along with surface energy ("SE") before and after water immersion. The reported values are the averages of three measurements. The data confirm that the coatings are stable when immersed in water and do not rearrange to yield a more hydrophilic surface due to the crosslinked nature of the films. Furthermore, the coatings exhibited low surface energy compared to the PU control, confirming the presence of PDMS at the surface of the coatings.

TABLE 9

Water contact angle measurements on experimental coatings.

| | Before Water Immersion | | | | | After Water Immersion | | | | |
|---|---|---|---|---|---|---|---|---|---|---|
| | Water | | MeI | | | Water | | MeI | | |
| Coating | CA (°) | Std Dev (°) | CA (°) | Std Dev (°) | SE (mN/m) | CA (°) | Std Dev (°) | CA (°) | Std Dev (°) | SE (mN/m) |
| 1 | 102.2 | 1.6 | 62.8 | 2.1 | 27.4 | 90.6 | 0.9 | 68.3 | 1.2 | 27.3 |
| 2 | 105.3 | 0.5 | 69.7 | 2.3 | 23.4 | 92.1 | 0.2 | 64.4 | 1.1 | 28.5 |
| 3 | 106.5 | 0.9 | 68.0 | 1.4 | 24.2 | 93.6 | 1.0 | 68.8 | 1.2 | 26.1 |
| 4 | 105.0 | 1.1 | 69.8 | 1.3 | 23.4 | 105.7 | 0.6 | 72.7 | 2.1 | 21.9 |
| 5 | 106.1 | 0.7 | 67.7 | 5.3 | 24.5 | 106.5 | 0.4 | 72.6 | 1.3 | 21.8 |
| 6 | 105.8 | 1.2 | 71.7 | 0.9 | 22.4 | 105.4 | 1.6 | 71.9 | 2.5 | 22.3 |
| 7 | 106.9 | 0.9 | 69.9 | 1.6 | 23.2 | 106.9 | 1.2 | 72.9 | 0.4 | 21.6 |
| 8 | 106.4 | 0.3 | 72.0 | 1.7 | 22.1 | 105.4 | 0.5 | 70.3 | 0.3 | 23.1 |
| 9 (PU control) | 88.3 | 0.6 | 47.3 | 1.9 | 37.6 | 73.1 | 1.0 | 63.4 | 1.7 | 36.9 |
| DC | 114.5 | 0.7 | 94.6 | 4.8 | 11.4 | 109.7 | 1.2 | 90.4 | 6.4 | 13.6 |
| DC | 112.8 | 0.5 | 88.0 | 6.8 | 11.3 | 107.6 | 2.7 | 83.9 | 10.5 | 16.5 |
| T2 | 114.3 | 0.4 | 95.7 | 2.1 | 14.0 | 108.8 | 1.0 | 90.5 | 1.9 | 13.8 |
| T2 | 110.8 | 4.0 | 94.6 | 1.8 | 12.0 | 104.0 | 3.8 | 87.0 | 1.6 | 16.0 |

TABLE 8

Pseudobarnacle adhesion results before and after water immersion. The values reported are the averages of three measurements, unless otherwise reported.

| | Before Water Immersion | | After 21 d Water Immersion | |
|---|---|---|---|---|
| Coating | Avg Release Force (N) | Std Dev (N) | Release Force (N) | Std Dev (N) |
| 1 | 14.1 | 9.41 | 8.4 | 0.55 |
| 2 | 8.7 | 0.07 | 8.7 | 0.20 |
| 3 | 8.6 | 0.03 | 8.5 | 0.03 |
| 4 | 9.4 | 1.56 | 8.5 | 0.10 |
| 5 | 8.2* | 0.29 | 8.5 | 0.00 |
| 6 | 8.4 | 0.02 | 8.5 | 0.05 |
| 7 (PU control) | 89.8 | 3.94 | Not Tested | NA |
| DC | 10.3 | 1.56 | Not Tested | NA |
| DC | 13.9 | 6.39 | Not Tested | NA |
| T2 | 17.2 | 7.83 | Not Tested | NA |
| T2 | 12.6* | 5.48 | Not Tested | NA |

*Only 2 measurements were included (3$^{rd}$ measurement was near 1N and determined as an outlier)

*C. lytica* Biofilm Retention

Figure 4:
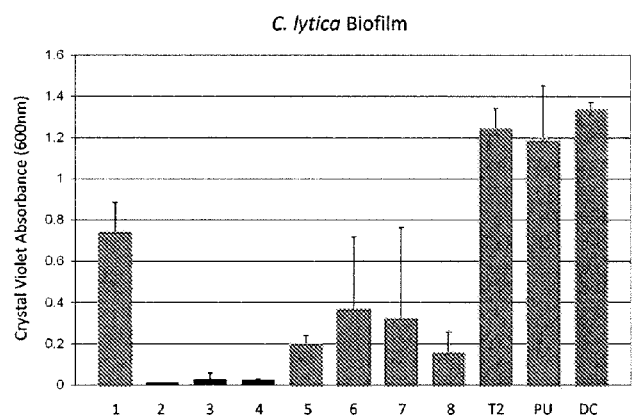
FIG. 4 shows biofilm retention data for C. lytica bioassay, quantified by staining with crystal violet, extraction, and absorbance measurements.

The data from the *C. lytica* biofilm retention (performed on coatings deposited in 24-well plate) bioassay is shown in FIG. 4. The *C. lytica* was allowed to attach in from a 5% culture. A growth period of 24 hours was allowed, followed by rinsing in triplicate and staining with crystal violet ("CV"). Acetic acid was used to extract the CV stain and the absorbance of the extract solution was measured at 600 nm. Very low biofilm retention was observed for all of the experimental coatings, which exhibited lower retention than the silicone controls. In addition, leachate toxicity was not observed.

*N. incerta* Bioassay

Figure 5:
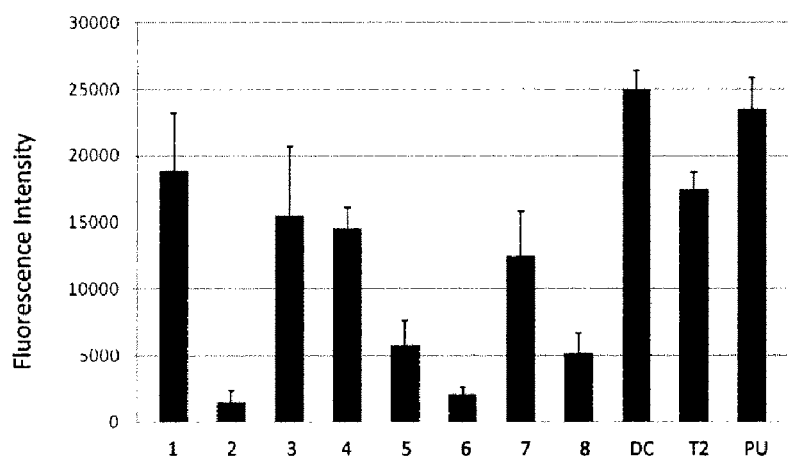
FIG. 5 shows: Navicula attachment data for the experimental and reference coatings; the chloroform fluorescence measurement illustrates the relative number of organisms attached to the coating surface.
Figure 6:
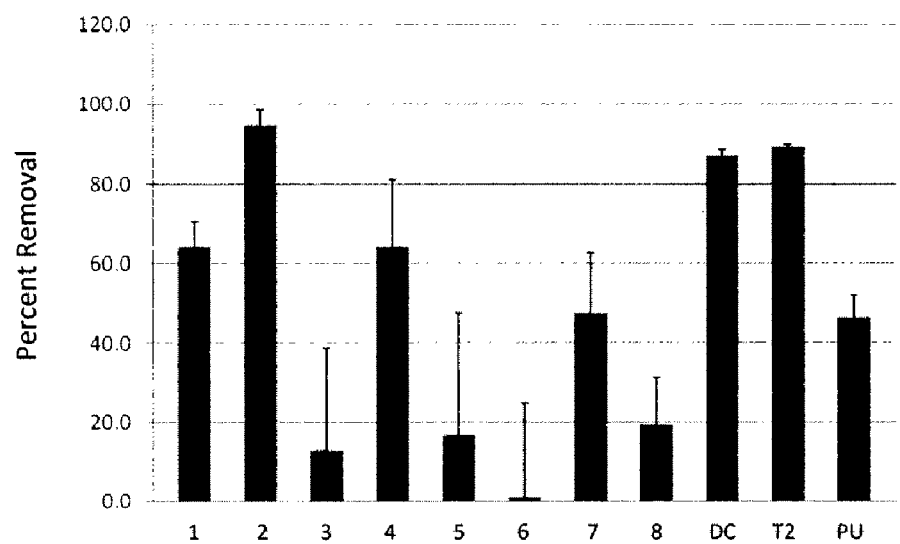
FIG. 6 shows N. incerta removal after 10 psi water jetting for 10 sec.

The data from the *Navicula incerta* attachment bioassay is shown in FIG. 5, illustrating the amount of diatoms that initially attached to the coatings (performed on coatings deposited in 24-well plate). The *N. incerta* was allowed to attach to the coatings for 2 hours (0.03 OD culture), the chlorophyll was extracted with DMSO, and fluorescence was measured to determine the relative amounts of attached organisms. Coatings 2 and 6 showed very low attachment of *N. incerta* while coatings 5 and 8 showed reduced *N. incerta* attachment compared to the other experimental and reference coatings. Coatings 1, 3, 4, and 7 showed a similar level of attachment as the DC, T2, and PU control coatings. FIG. 6 shows data obtained when the attached *N. incerta* were removed by water jetting. The same attachment procedure was used as previously described; the samples were exposed to a 10 psi water jet, and the attachment was quantified in the manner described above. While low values of attachment are desired, a high level of removal of the organisms is desired, and was observed in some cases, as shown in FIG. 6. Coating 2 showed the highest level of *N. incerta* removal while coatings 1, 4, and 7 showed moderate removal and 3, 5, and 8 showed low removal and coating 6 showed no removal at all. While the identification of a trend is difficult in the case of this data, the coatings with higher molecular weight PDMS (10,000 g/mol and 15,000 g/mol) seemed to show reduced attachment and greater release compared to those prepared with lower molecular weight PDMS.

Barnacle Reattachment Bioassay

Barnacle reattachment was performed by allowing live barnacles to reattach to the surface of the coatings for a period of 14 days after removal from a silicone surface. Testing was performed on coatings applied to A1 panels. The barnacles were removed using a digital force gauge and their removal forces were recorded. Initially, the test was performed at 14 days of water immersion and very low barnacle reattachment forces were obtained (Table 10). However, when the procedure was repeated on coatings that had been subjected to water immersion for 49 days, higher removal forces were obtained. Although the reattachment forces were higher for the coatings subjected to the longer water immersion time, the coatings with higher molecular weight PDMS (10,000 g/mol and 15,000 g/mol) performed the best in both cases, with lower release forces than the other coatings, including the silicone controls.

TABLE 10

Barnacle reattachment data for experimental coating with 14 and 49 days of pre-leaching.

| | 14 days of pre-leaching | | | 49 days of pre-leaching | | |
|---|---|---|---|---|---|---|
| Coating ID | Mean Reattached Adhesion (Mpa) | Std Dev (Mpa) | n | Mean Reattached Adhesion (Mpa) | Std Dev (Mpa) | n |
| 1 | 0.16 | 0.09 | 9 | 0.56 | 0.20 | 5 |
| 2 | 0.18 | 0.11 | 9 | 0.53 | 0.16 | 7 |
| 3 | 0.09 | 0.06 | 9 | 0.55 | 0.07 | 6 |
| 4 | 0.03 | 0.04 | 7 | 0.42 | 0.12 | 8 |
| 5 | 0.02 | 0.01 | 6 | 0.27 | 0.10 | 9 |
| 6 | 0.03 | 0.01 | 7 | 0.15 | 0.05 | 8 |
| 7 | 0.02 | 0.01 | 7 | 0.20 | 0.08 | 8 |
| 8 | 0.02 | 0.01 | 6 | 0.10 | 0.04 | 7 |
| 9 (PU control) | 0.24 | 0.13 | 9 | 0.48 | 0.03 | 5 |
| DC 3140 | 0.19 | 0.11 | 8 | 0.31 | 0.11 | 7 |
| T2 | 0.30 | 0.16 | 6 | 0.34 | 0.13 | 9 |

*N. incerta* Bioassay

A similar bioassay to the *N. incerta* assay described above was performed on the same coatings (on A1 panels), excluding the PU control (Coating 9), but with the addition of an Intersleek fouling-release control. However, attachment was allowed until a thick biofilm was observed, water jetting was performed to remove the biofilm and removal was estimated visually. The results from the water jet removal are outlined in Table 11. In general, the coatings prepared with the lower molecular weight PDMS (1,000 g/mol and 5,000 g/mol) showed greater diatom release than those prepared with the higher molecular weight PDMS macromers.

TABLE 11

Summary of diatom release at various water jet pressures

| | % removal at impact pressure | | | |
|---|---|---|---|---|
| Coating | 64 kPa | 73 kPa | 93 kPa | 132 kPa |
| IS | 100 | — | — | — |
| DC | 40 | 100 | 100 | 100 |
| T2 | 20 | 100 | 100 | 100 |
| 1 | 100 | 100 | 100 | 100 |
| 2 | 100 | 100 | 100 | 100 |
| 3 | 70 | 90 | 50 | 70 |
| 4 | 90 | 70 | 75 | 60 |
| 5 | 5 | 5 | 95 | 95 |
| 6 | 5 | 0 | 50 | 50 |
| 7 | 35 | 70 | 95 | 100 |
| 8 | 40 | 50 | 100 | 100 |

*Ulva* Sporeling Bioassay

Figure 7:
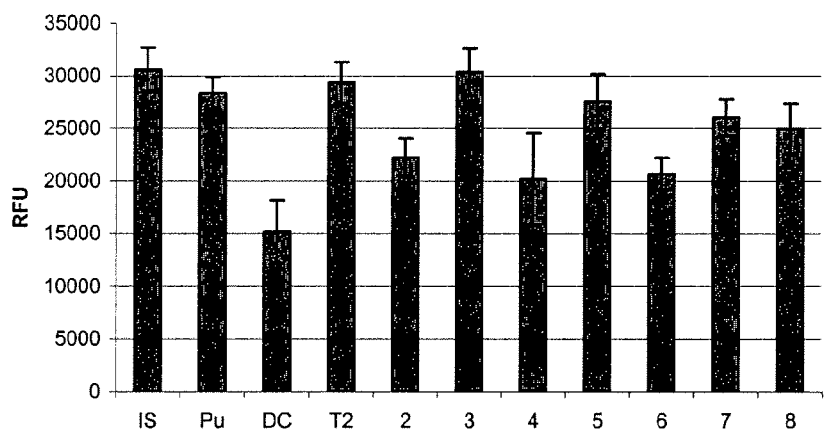
FIG. 7 shows Ulva sporeling attachment, as measured by the extraction of chlorophyll; each point is the mean of 6 replicates and the error bars show 95% confidence limits.
Figure 8:
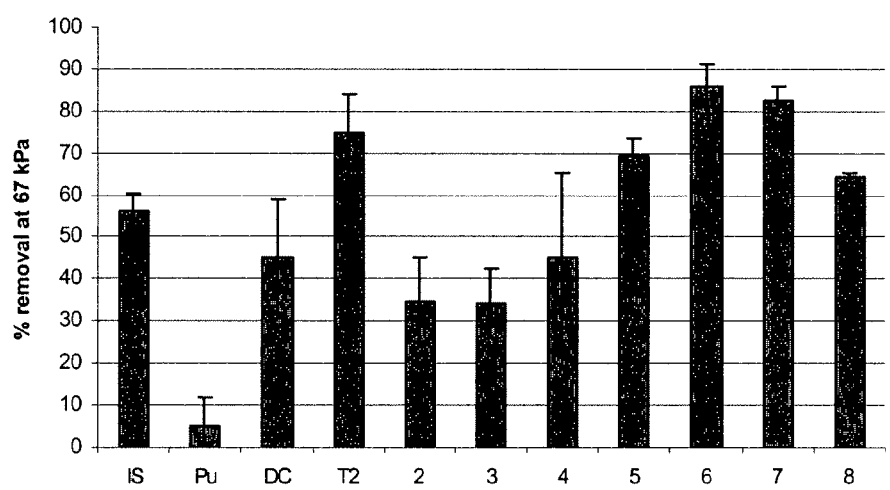
FIG. 8 shows water jet removal of Ulva sporelings after 7 days growth using an impact pressure of 67 kPa; each point is the mean of 6 replicates and the error bars show 95% confidence limits.

Fouling-release studies using *Ulva* sporelings were carried out. *Ulva* sporelings were allowed to adhere to the test coatings (deposited into 24-well plates) for seven days and the amount of attachment was measured by extracting the chlorophyll and measuring fluorescence. This data are shown in FIG. 7 as the mean of 6 replicates and error bars representing 95% confidence limits. The sporelings were removed by water jetting at 64 kPa and this data is shown in FIG. 8. Coatings 5, 6, 7, and 8 performed comparably to the T2 control (60-80% removal), which is typically performs well as a fouling-release coating in this bioassay. The other coatings also had better removal than the polyurethane without the siloxane.

Example 2

Synthesis of Branched PDMS and Use in Coatings

Macromer Synthesis

Hexamethylcyclotrisiloxane ("D3") was dissolved in tetrahydrofuran ("THF") at a concentration of 50 wt %. The solution was degassed by bubbling nitrogen ("$N_2$") gas through it. Lithium trimethylsilanolate ("LTMS") salt solution (1.0M in $CH_2Cl_2$) was added to the solution to initiate polymerization at room temperature. The amounts of LTMS and D3 added were in the appropriate molar ratios to achieve a final molecular weight of 5,000 g/mol. After 24 hours of reaction time, the living polymerization was terminated by the addition of dimethylchlorosilane ("CDMS") at 2-5° C. The terminating agent, CDMS, was added in excess to ensure termination of all "living" polymer chain ends. The amount of D3 monomer solution, LTMS initiator, and CDMS terminating agent that were used for the polymerization and termination are shown in Table 12. The solutions were rotary evaporated to remove THF and excess CDMS. A lithium chloride ("LiCl") precipitate, caused the polymer to appear cloudy. The LiCl precipitate was removed by vacuum filtration to yield a clear, monohydride terminated poly(dimethyl siloxane) ("PDMS") macromer ("HT-PDMS-M").

TABLE 12

Amounts of D3, LTMS and CDMS used in polymerization and termination of 5000 g/mol PDMS macromer.

| Theoretical MW (g/mol) | D3 Mass (g) | D3 mMol | LTMS soln 1.0M (CH$_2$Cl$_2$) Mass (g) | LTMS Mass (g) | LTMS mMol | CDMS Mass (g) | CDMS mMol |
|---|---|---|---|---|---|---|---|
| 5,000 | 147.2 | 662 | 39.1 | 2.94 | 30.6 | 10.0 | 105.4 |

Macromer Functionalization

For functionalization, the PDMS, stoichiometric amounts of allyl ether were dissolved in toluene at a concentration of 30% solids. The solutions were degassed by bubbling N$_2$ through them. Hydrosilylation was carried out at 60° C. in the presence of Karstedt's catalyst (1 drop of catalyst in xylene (2.1-2.4% Pt) was added). The reactions were run for 77 hours in 25-27 hour increments, but an Si—H peak remained at 4.7 ppm in $^1$H NMR. Therefore, an excess of polyol was added and the reactions were run for 25 hours at 60° C. The reactions had completed (absence of Si—H peak), but residual allyl peaks were observed in $^1$H NMR. Table 13 summarizes the reagent amounts used for the hydrosilylation reactions, with and without the addition of excess allyl ether. Scheme 8 shows the reaction schemes for the functionalization of the branched PDMS macromers. The allyl ethers used to synthesize branched PDMS macromers are: allyl pentaerythritol ("APE"), trimethylolpropane diallyl ether ("TMPDE": 90% diallyl ether), trimethylolpropane monoallyl ether ("TMPME"), and allyloxyethanol ("AOE"). The solvent was evaporated from the samples using the Genevac (mid-low boiling point, 12 hours, 65° C., overnight). The macromers were extracted several times with methanol to remove color and to remove the unreacted ally ether polyol.

TABLE 13

Reagent amounts for hydrosilylation of HT-PDMS-M for the functionalization of branched PDMS macromers.

| Allyl Ether | Allyl Ether MW (g/mol) | PDMS (g) | PDMS (mmol) | Allyl ether (g) | Allyl Ether (mmol) | Toluene (g) | Excess allyl ether (g) | Excess allyl ether (mmol) |
|---|---|---|---|---|---|---|---|---|
| TMPME | 174.3 | 9.66 | 1.93 | 0.34 | 1.93 | 23.33 | 1.50 | 8.61 |
| APE | 256.4 | 9.83 | 1.97 | 0.17 | 0.66 | 23.33 | 1.50 | 5.85 |
| TMPDE 90 | 213.3 | 9.79 | 1.96 | 0.21 | 0.98 | 23.33 | 1.50 | 7.03 |
| Allyloxyethanol | 102.1 | 9.80 | 1.96 | 0.20 | 1.96 | 23.33 | 1.50 | 14.69 |

Scheme 8: Reaction schemes for functionalization of branched PDMS macromers.

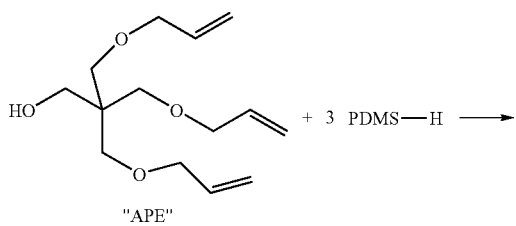

"APE"

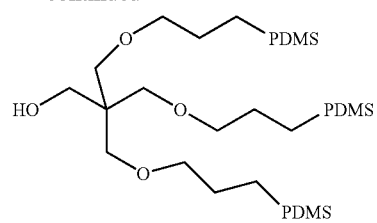

-continued

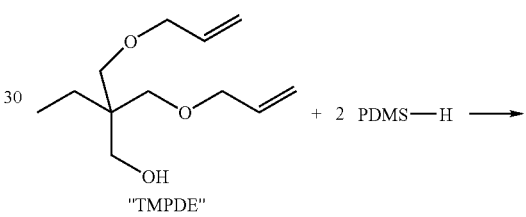

"TMPDE"

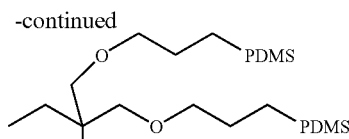

-continued

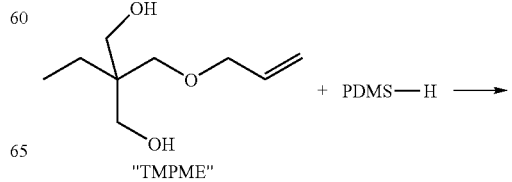

"TMPME"

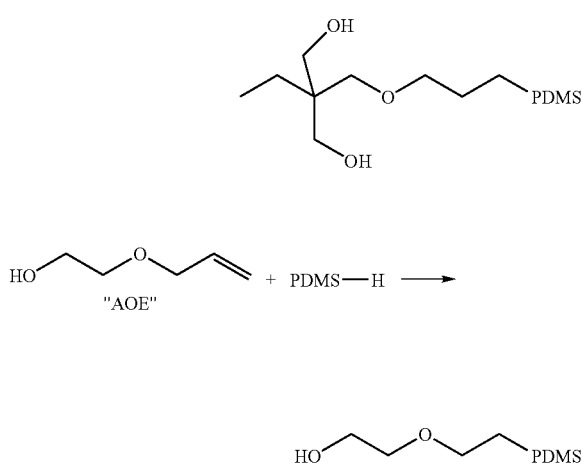

Macromer Characterization

The HT-PDMS-M was characterized using gel permeation chromatography ("GPC"), to confirm the molecular weight of the macromers. The branched macromers were also characterized by GPC. The number average molecular weight ("MW"), weight average MW and polydispersity index ("PDI") of the macromers, obtained from GPC analysis, relative to polystyrene standards, are shown in Table 14.

TABLE 14

Molecular weight data for HT-PDMS-M, per GPC relative to polystyrene standards. The number and weight average MWs are shown, as well as polydispersity index.

| Sample | Number average MW | Weight average MW | PDI |
|---|---|---|---|
| HT-PDMS-M 5000 g/mol | 5200 | 5900 | 1.1 |
| TMPME-PDMS-M | 4700 | 5400 | 1.2 |
| APE-PDMS-M | 4200 | 6300 | 1.5 |
| TMPDE 90-PDMS-M | 5400 | 6600 | 1.2 |
| Allyloxyethanol-PDMS-M | 5300 | 6500 | 1.2 |

Coating Formulation

Polyurethane ("PU")-PDMS coating formulations were prepared using the APT-PDMS-Ms, isophorone diisocyanate trimer ("IDT", 70% in butyl acetate ("BA"), Tolonate IDT 70B), a polycaprolactone polyol ("PCL", Tone polyol 0305), dibutyltin diacetate ("DBTDAc") as a catalyst, 2,4-pentanedione (PD) as a pot-life extender and methyl amyl ketone ("MAK") as solvent. The PCL polyol (90% in MAK) and DBTDAc (1% in MAK) were used as solutions for formulation purposes while Tolonate IDT 70B was used as is (70% in BA). The PDMS macromers were used neat. The coatings were formulated with a 1.1:1 ratio of isocyanate to hydroxyl and amine equivalents. The coating formulations are outlined in Table 15 with reagent quantities for approximately 10 grams of total formulation. The coating formulations were prepared by first mixing the PDMS-M with the polyol solution overnight. The PD was added and the formulation was mixed. The addition of IDT 70B and DBTDAc solutions followed in that order. The coating formulations are summarized in Table 15 while their compositions are outlined in Table 16.

TABLE 15

Coating formulation recipes

| Coating ID | PDMS-M (g) | 90% PCL polyol in MAK (g) | PD (g) | Tolonate IDT 70B (g) | 1% DBTDAc in MAK |
|---|---|---|---|---|---|
| TMPE-PDMS-M-10 | 0.750 | 2.39 | 0.98 | 6.57 | 0.11 |
| TMPE-PDMS-M-5 | 0.375 | 2.54 | 0.99 | 6.91 | 0.11 |
| TMPE-PDMS-M-1 | 0.075 | 2.66 | 1.00 | 7.18 | 0.11 |
| APE-PDMS-M 10 | 0.750 | 2.39 | 0.98 | 6.57 | 0.11 |
| APE-PDMS-M-5 | 0.375 | 2.54 | 0.99 | 6.91 | 0.11 |
| APE-PDMS-M-1 | 0.075 | 2.66 | 1.00 | 7.18 | 0.11 |
| TMPDE 90-PDMS-M-10 | 0.750 | 2.39 | 0.98 | 6.57 | 0.11 |
| TMPDE 90-PDMS-M-5 | 0.375 | 2.54 | 0.99 | 6.91 | 0.11 |
| TMPDE 90-PDMS-M-1 | 0.075 | 2.66 | 1.00 | 7.18 | 0.11 |
| Allyloxyethanol-PDMS-M-10 | 0.750 | 2.39 | 0.98 | 6.57 | 0.11 |
| Allyloxyethanol-PDMS-M-5 | 0.375 | 2.54 | 0.99 | 6.91 | 0.11 |
| Allyloxyethanol-PDMS-M-1 | 0.075 | 2.66 | 1.00 | 7.18 | 0.11 |

TABLE 16

Coating formulation compositions

| Coating ID | Weight % of Solids | | | | DBTDAc (based on total solids) | Weight % of Solvent | | PD (based on total formulation) |
|---|---|---|---|---|---|---|---|---|
| | PDMS-M | IDT | PCL polyol | Total Solids | | BA | MAK | |
| TMPE-PDMS-M-10 | 10% | 61% | 29% | 76% | 0.015% | 85% | 15% | 10% |
| TMPE-PDMS-M-5 | 5% | 65% | 30% | 75% | 0.015% | 85% | 15% | 10% |
| TMPE-PDMS-M-1 | 1% | 67% | 32% | 75% | 0.015% | 85% | 15% | 10% |
| APE-PDMS-M 10 | 10% | 61% | 29% | 76% | 0.015% | 85% | 15% | 10% |

TABLE 16-continued

Coating formulation compositions

| | Weight % of Solids | | | | DBTDAc | Weight % of Solvent | | PD (based |
|---|---|---|---|---|---|---|---|---|
| Coating ID | PDMS-M | IDT | PCL polyol | Total Solids | (based on total solids) | BA | MAK | on total formulation) |
| APE-PDMS-M-5 | 5% | 65% | 30% | 75% | 0.015% | 85% | 15% | 10% |
| APE-PDMS-M-1 | 1% | 67% | 32% | 75% | 0.015% | 85% | 15% | 10% |
| TMPDE 90-PDMS-M-10 | 10% | 61% | 29% | 76% | 0.015% | 85% | 15% | 10% |
| TMPDE 90-PDMS-M-5 | 5% | 65% | 30% | 75% | 0.015% | 85% | 15% | 10% |
| TMPDE 90-PDMS-M-1 | 1% | 67% | 32% | 75% | 0.015% | 85% | 15% | 10% |
| Allyloxyethanol-PDMS-M-10 | 10% | 61% | 29% | 76% | 0.015% | 85% | 15% | 10% |
| Allyloxyethanol-PDMS-M-5 | 5% | 65% | 30% | 75% | 0.015% | 85% | 15% | 10% |
| Allyloxyethanol-PDMS-M-1 | 1% | 67% | 32% | 75% | 0.015% | 85% | 15% | 10% |

Pseudobarnacle Adhesion

Pseudobarnacle adhesion ("PB") was performed on the coatings approximately 20 hours after initial attachment of the studs. This was performed on the as-made samples. The results from this test are shown in Table 17. The three reported values are averages of three measurements, unless otherwise noted. The samples prepared with Allyloxyethanol-PDMS-M were delaminated at the substrate-coating surface (or the adhesive was left on the coating and delamination occurred between the PB and the epoxy) when the PB was removed. A similar observation was made for one or more testing replicates of the following samples: TMPE-PDMS-M-5, and TMPE-PDMS-M-1.

TABLE 17

Pseudobarnacle adhesion results before water immersion.

| | Before Water Immersion | |
|---|---|---|
| Coating | Average Release Force (N) | Std Dev (N) |
| TMPE-PDMS-M-10 | 8.0 | 0.2 |
| TMPE-PDMS-M-5 | 31.3 | 25.6 |
| TMPE-PDMS-M-1 | 60.8 | 16.6 |
| APE-PDMS-M-10 | 29.7 | 22.2 |
| APE-PDMS-M-5 | 8.0 | 0.0 |
| APE-PDMS-M-1 | 8.2 | 0.2 |
| TMPDE 90-PDMS-M-10 | 8.0 | 0.2 |
| TMPDE 90-PDMS-M-5* | 7.9 | 0.1 |
| TMPDE 90-PDMS-M-1 | 8.2 | 0.8 |
| Allyloxyethanol-PDMS-M-10 | 37.3 | 3.9 |
| Allyloxyethanol-PDMS-M-5 | 37.9 | 16.0 |
| Allyloxyethanol-PDMS-M-1 | 49.9 | 28.0 |

*Only 2 measurements were included (3rd was near 1N and determined as an outlier)

Contact Angle and Surface Energy

Contact angle ("CA") measurements were performed on coatings on 3'×6" aluminum panels using water and methylene iodide ("MeI"). Table 18 summarizes the water and MeI contact angles, along with surface energy ("SE"). The reported values are the averages of three measurements.

TABLE 18

Water and methylene iodide ("MeI") contact angle measurements on experimental coatings. The values are the averages of three measurements

| | Water | | MeI | | |
|---|---|---|---|---|---|
| Coating | CA (°) | Std Dev (°) | CA (°) | Std Dev (°) | SE (nN/m) |
| TMPE-PDMS-M-10 | 88.1 | 1.5 | 45.9 | 1.4 | 38.3 |
| TMPE-PDMS-M-5 | 90.4 | 0.2 | 43.1 | 5.2 | 39.1 |
| TMPE-PDMS-M-1 | 95.0 | 1.4 | 56.1 | 1.9 | 31.9 |
| APE-PDMS-M 10 | 88.4 | 0.8 | 46.2 | 2.8 | 38.0 |
| APE-PDMS-M-5 | 89.3 | 1.2 | 47.6 | 3.4 | 37.2 |
| APE-PDMS-M-1 | 97.3 | 1.2 | 49.1 | 7.3 | 35.1 |
| TMPDE 90-PDMS-M-10 | 92.4 | 3.1 | 47.3 | 4.5 | 36.7 |
| TMPDE 90-PDMS-M-5 | 91.0 | 0.3 | 49.1 | 3.2 | 36.1 |
| TMPDE 90-PDMS-M-1 | 97.2 | 0.5 | 46.5 | 6.3 | 36.5 |
| Allyloxyethanol-PDMS-M-10 | 86.5 | 1.5 | 32.6 | 2.1 | 44.4 |
| Allyloxyethanol-PDMS-M-5 | 87.5 | 0.9 | 26.3 | 1.8 | 46.5 |
| Allyloxyethanol-PDMS-M-1 | 84.7 | 3.6 | 33.6 | 3.6 | 44.4 |

ILLUSTRATIVE EMBODIMENTS

Reference is made in the following to a number of illustrative embodiments of the subject matter described herein. The following embodiments describe illustrative embodiments that may include the various features, characteristics, and advantages of the subject matter as presently described. Accordingly, the following embodiments should not be considered as being comprehensive of all of the possible embodiments.

One embodiment provides polymeric material prepared by reacting a mixture comprising: polyisocyanate; polyol; and a polysiloxane component having two or more polyorganosiloxane chains attached to a linker molecule, which has one or more functional groups capable of reacting with the polyisocyanate. Optionally the polysiloxane component has a formula I:

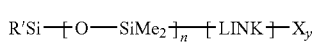

where R'Si— is a terminal group; n is about 10 to 1,000; LINK is a linking group; X is —OH or —NH2; and y is an integer from 1 to 4. Optionally the LINK is an alkylene group which may have one or more oxygen, nitrogen or sulfur atoms substituted for a carbon atom of its backbone. Optionally the LINK has no more than about 10 atoms in its backbone. Suitable R'Si— terminal groups may be trialkylsilyl groups, such as $R_3Si$— groups, e.g., $Me_3Si$—, or $R^1R_2Si$— groups, e.g., $BuMe_2Si$—. Optionally the mixture has a ratio of (isocyanate groups)/(amine+alcohol groups) of about 1.0 to 1.2. Optionally, the polyisocyanate comprises hexamethylene diisocyanate trimer, isophorone diisocyanate trimer, or a mixture thereof. Optionally the polyol comprises hydroxy-functional poly(meth)acrylate. Optionally the polyol comprises polycaprolactone polyol. Optionally the hydroxy-functional poly(meth)acrylate is formed from a monomer mixture comprising hydroxyalkyl acrylate and alkyl acrylate. Optionally the mixture is a coating composition. Optionally the mixture comprises about 30 to 85 wt. % of the polyisocyanate.

Another embodiment provides polymeric material prepared by reacting a mixture comprising: polyisocyanate; polyorganosiloxane having two or more functional groups capable of reacting with the polyisocyanate attached to only a single end of the polyorganosiloxane; and polyol. Optionally the polyorganosiloxane has (a) two or more amino groups or, (b) two or more hydroxy groups attached to only a single end of the polyorganosiloxane. Optionally the mixture has a ratio of (isocyanate groups)/(amine+alcohol groups) of about 1.0 to 1.2. Optionally, the polyisocyanate comprises hexamethylene diisocyanate trimer, isophorone diisocyanate trimer, or a mixture thereof. Optionally the polyol comprises hydroxy-functional poly(meth)acrylate. Optionally the polyol comprises polycaprolactone polyol. Optionally the hydroxy-functional poly(meth)acrylate is formed from a monomer mixture comprising hydroxyalkyl acrylate and alkyl acrylate. Optionally the polyorganosiloxane has a number average molecular weight of about 500 to 30,000. Optionally the mixture is a coating composition. Optionally the mixture comprises about 30 to 85 wt. % of the polyisocyanate.

Another embodiment provides polymeric material prepared by reacting a mixture comprising: polyisocyanate; polyorganosiloxane having one or more hydroxyl alkyl carbamate groups attached to only a single end of the polyorganosiloxane; and polyol. Optionally the mixture has a ratio of (isocyanate groups)/(amine+alcohol groups) of about 1.0 to 1.2. Optionally, the polyisocyanate comprises hexamethylene diisocyanate trimer, isophorone diisocyanate trimer, or a mixture thereof. Optionally the polyol comprises hydroxy-functional poly(meth)acrylate. Optionally the polyol comprises polycaprolactone polyol. Optionally the hydroxy-functional poly(meth)acrylate is formed from a monomer mixture comprising hydroxyalkyl acrylate and alkyl acrylate. Optionally the polyorganosiloxane has a number average molecular weight of about 500 to 30,000. Optionally the mixture is a coating composition. Optionally the mixture comprises about 30 to 85 wt. % of the polyisocyanate.

Another embodiment provides a polymeric material prepared by reacting a mixture comprising: a polyorganosiloxane having one or more amino groups, wherein the amino groups are attached to only a single end of the polyorganosiloxane; polyisocyanate; and polyol. Optionally the polyorganosiloxane includes poly(dialkylsiloxane) having one or more amino groups attached thereto.

Another embodiment provides a method of inhibiting fouling on a surface exposed to aqueous conditions comprising applying the coating composition of any of the illustrative embodiments described int he preceding paragraphs above.

Another embodiment provides a substrate having a surface capable of being exposed to aqueous conditions; wherein the surface has a fouling release coating thereon; and the coating comprises the polymeric material of any of the illustrative embodiments described in the preceding paragraphs above. Optionally the coating may have an initial water contact angle of at least about 100°. Optionally the water contact angle changes by no more than about 10° after immersion in deionized water for 30 days. Optionally the coating may have an initial pseudobarnacle pull off adhesion release force of no more than about 80 N.

Another embodiment provides a method of inhibiting fouling on a surface exposed to aqueous conditions comprising applying a fouling release coating composition to the surface where the coating composition comprises: about 2 to 20 wt. % (on a solids basis) of an amino functional polyorganosiloxane; from about 30 wt. % to 85 wt. % (on a solids basis) of polyisocyanate; and polyol. Optionally the polyorganosiloxane has a number average molecular weight of about 1,000 to 20,000 and has one or more amino groups attached to only a single end of the polymer; and the coating composition has a ratio of (isocyanate groups)/(amine+alcohol groups) of about 1.05 to 1.15.

One embodiment provides a polymeric material prepared by reacting a mixture comprising: an amino functional polyorganosiloxane that has one or more amino groups attached to only a single end of the polymer chain; polyisocyanate; and polyol. Optionally, the polymeric material may have an initial water contact angle of at least about 90°. Optionally the water contact angle may change no more than about 10° after immersion in deionized water for 30 days. Optionally the polymeric material may have an initial pseudobarnacle pull off adhesion release force of no more than about 80 N. Optionally the amino functional polyorganosiloxane may include poly(dialkylsiloxane) having one or more amino groups attached to only a single end of the polymer chain.

Another embodiment provides a method of inhibiting fouling on a surface exposed to aquatic conditions including applying a fouling release coating composition to the surface, where the coating composition comprises: an amino functional polyorganosiloxane; polyisocyanate; and polyol. Optionally the amino functional polyorganosiloxane may have one or more amino groups attached to only a single end of the polymer chain. Optionally the polyisocyanate may comprise hexamethylene diisocyanate trimer, isophorone diisocyanate trimer, or a mixture thereof. Optionally, the amino functional polyorganosiloxane may have a number average molecular weight of about 500 to 30,000. Optionally the amino functional polyorganosiloxane may have a number average molecular weight of at least about 2,000. Optionally the amino functional polyorganosiloxane may have a number average molecular weight of at least about 10,000.

Another embodiment provides a substrate having a surface capable of being exposed to aquatic conditions, where the surface has a fouling release coating thereon, and the coating comprises a polymeric material prepared by reacting a mixture comprising: an amino functional polysiloxane, where the polysiloxane has one or more amino groups attached to only a single end of the polymer chain; polyisocyanate; and polyol.

Optionally the amino functional polysiloxane coating composition comprises an amino functional polyorganosiloxane. Optionally the mixture comprises about 30 wt % to 85 wt % of polyisocyanate. Optionally the polyol may comprise hydroxy-functional poly(meth)acrylate. Optionally the hydroxy-functional poly(meth)acrylate may be formed from a monomer mixture comprising hydroxyalkyl acrylate and alkyl acrylate. Optionally the hydroxy-functional poly(meth)acrylate may include hydroxyethyl acrylate/butyl acrylate copolymer. Optionally the polyol may comprise polycaprolactone polyol.

One embodiment provides a polymeric material prepared by reacting a mixture comprising polyorganosiloxane having functional groups capable of reacting with the polyisocyanate, wherein the polyorganosiloxane comprises polyorganosiloxane having one or more amino groups attached to only a single end of the polymer; polyisocyanate; and polyol. Optionally, the polyorganosiloxane may comprise aminofunctional poly(dialkylsiloxane) having one or more amino groups attached to only a single end of the polymer chain. Optionally, the polyorganosiloxane may comprise aminofunctional poly(dimethylsiloxane) having amino groups attached to only a single end of the polymer chain. Optionally, the amino-functional poly(dimethylsiloxane) is an aminoalkyl terminated poly(dimethylsiloxane), such as aminopropyl terminated poly(dimethylsiloxane) or aminoethyl terminated poly(dimethylsiloxane).

Another embodiment provides a method of inhibiting fouling on a surface exposed to aquatic conditions comprising applying a fouling release coating composition to the surface where the coating composition comprises: from about 2 wt. % to 20 wt. % (on a solids basis) of an amino functional polyorganosiloxane; from about 30 wt. % to 85 wt. % (on a solids basis) of polyisocyanate; and polyol. Optionally the coating composition may have a ratio of (isocyanate groups)/(amine and alcohol groups) of about 1.0 to 1.2. Optionally the coating composition may have a ratio of (isocyanate groups)/(amine and alcohol groups) of about 1.05 to 1.15. Optionally the coating composition may comprise about 5 wt % to 15 wt % (on a solids basis) of the amino functional polyorganosiloxane. Optionally the amino functional polyorganosiloxane may have a number average molecular weight of about 500 to 30,000. Optionally the amino functional polyorganosiloxane may have a number average molecular weight of about 1,000 to 20,000. Optionally the polyisocyanate may comprise hexamethylene diisocyanate trimer, isophorone diisocyanate trimer or a mixture thereof.

Another embodiment provides a method of inhibiting fouling on a surface exposed to aquatic conditions comprising applying a fouling release coating composition to the surface, where the coating composition comprises: from about 2 wt % to 20 wt % (on a solids basis) of an amino functional polyorganosiloxane, where the polyorganosiloxane may have a number average molecular weight of about 1,000 to 20,000 and may comprise polyorganosiloxane having one or more amino groups attached to only a single end of the polymer; polyisocyanate; and polyol, where the coating composition has a ratio of (isocyanate groups)/(amine and alcohol groups) of about 1.05 to 1.15.

Another embodiment provides a polymeric material prepared by reacting a mixture comprising: polyisocyanate; polyorganosiloxane that may have one or more functional groups capable of reacting with the polyisocyanate attached to only a single end of the polyorganosiloxane; and polyol. Optionally the polyorganosiloxane may have (a) two or more amino groups or, (b) two or more hydroxy groups attached to only a single end of the polyorganosiloxane.

Another embodiment provides a polymeric material prepared by reacting a mixture comprising: polyisocyanate; polyorganosiloxane that may have one or more functional groups capable of reacting with the polyisocyanate attached to only a single end of the polyorganosiloxane and where the polyorganosiloxane may comprise polyorganosiloxane that may have a hydroxyl alkyl carbamate group attached to only a single end of the polyorganosiloxane; and polyol.

Another embodiment provides a polymeric material prepared by reacting a mixture comprising: polyisocyanate; polyorganosiloxane that may have one or more functional groups capable of reacting with the polyisocyanate; and polyol.

Another embodiment provides a polymeric material prepared by reacting a mixture comprising: polyisocyanate; polyorganosiloxane having one or more hydroxyl alkyl carbamate groups attached to only a single end of the polyorganosiloxane; and polyol.

Another embodiment provides a polymeric material prepared by reacting a mixture comprising: polyisocyanate; two or more polyorganosiloxanes attached to a linker molecule having one or more functional groups capable of reacting with the polyisocyanate; and polyol.

One embodiment (A) provides a method of inhibiting fouling on a boat hull comprising applying a fouling release coating composition to at least a portion of the hull, where the coating composition comprises a polymeric material prepared by reacting a mixture comprising: an amino functional polyorganosiloxane having one or more amino groups attached to a single end of the polyorganosiloxane; polyisocyanate; and polyol.

The amino functional polyorganosiloxane used in embodiment (A) may optionally have a number average molecular weight of at least about 500; commonly no more than about 50,000; e.g., an amino functional polyorganosiloxane having a number average molecular weight of about 1,000 to 30,000; and, desirably, about 1,000 to 5,000. The amino functional polyorganosiloxane may typically be an amino functional poly(dialkylsiloxane) having one or two amino groups connected to a single end of the poly amino functional polyorganosiloxane, e.g., covalently linked to the amino functional polyorganosiloxane through an alkylene or cycloalkylene linking group. For example, the amino functional polyorganosiloxane may be an aminoalkyl terminated poly(dialkylsiloxane), such as an aminoethyl or aminopropyl terminated PDMS. The amino functional poly(dialkylsiloxane) may have a number average molecular weight of at least about 500 and, more commonly, about 1,000 to 5,000.

The polymeric material of embodiment (A) may have an initial water contact angle of at least about 70°. The polymeric material may optionally have a water contact angle that changes no more than about 20° after immersion in deionized water for 30 days. More desireably, the polymeric material may have an initial water contact angle of at least about 80° and, in some instances, may have an initial water contact angle of about 90° or higher.

The polymeric material of embodiment (A) may have an initial pseudobarnacle pull off adhesion release force of no more than about 80 N. In some instances, the polymeric material may have an initial pseudobarnacle pull off adhesion release force of no more than about 50 N and, in some instances, may have an initial pseudobarnacle pull off adhesion release force of no more than about 15 N.

Another embodiment (B) provides a substrate, such as a boat hull, having fouling release coating on a surface thereof; where the coating comprises a polymeric material prepared by reacting a mixture comprising: an amino functional poly (dialkylsiloxane) having one or more amino groups attached to a single end of the polyorganosiloxane; polyisocyanate; and polyol. Optionally, the substrate may comprise a coating that may have an initial pseudobarnacle pull off adhesion release force of no more than about 60 N. Optionally the coating may have an initial water contact angle of at least about 70°. Optionally the coating may have a water contact angle which may change no more than about 20° after immersion in deionized water for 30 days. Optionally the coating may have a water contact angle that may change no more than about 15° after immersion in deionized water for 30 days. Optionally the coating may have a water contact angle that may change no more than about 10° after immersion in deionized water for 30 days.

One embodiment (C) provides a polymeric material prepared by reacting a mixture comprising: an amino functional poly(dialkylsiloxane) having one or more amino groups attached to a single end of the polyorganosiloxane; polyisocyanate; and polyol. Optionally, the polymeric material may have an initial water contact angle of at least about 70°. Optionally, the polymeric material may have an initial water contact angle of at least about 80°. Optionally, the polymeric material may have an initial water contact angle of at least about 90°.

Optionally, the polymeric material of embodiment (C) may have a water contact angle that changes no more than about 20° after immersion in deionized water for 30 days. Optionally, the polymeric material may have a water contact angle that changes no more than about 15° after immersion in deionized water for 30 days. Optionally, the polymeric material may have a water contact angle that changes no more than about 10° after immersion in deionized water for 30 days.

The polymeric material of embodiment (C) may optionally have an initial pseudobarnacle pull off adhesion release force of no more than about 60 N. Optionally the polymeric material may have an initial pseudobarnacle pull off adhesion release force of no more than about 50 N. Optionally the polymeric material may have an initial pseudobarnacle pull off adhesion release force of no more than about 30 N. Optionally the polymeric material may have an initial pseudobarnacle pull off adhesion release force of no more than about 15 N.

The amino functional polyorganosiloxane of embodiment (C) may have a number average molecular weight of at least about 500; commonly no more than about 50,000; e.g., amino functional polyorganosiloxane having a number average molecular weight of about 1,000 to 30,000; and, desirably, about 1,000 to 5,000.

The amino functional polyorganosiloxane of embodiment (C) may typically be an amino functional poly(dialkylsiloxane) having one or two amino groups connected to a single end of the poly amino functional polyorganosiloxane, e.g., covalently linked to the amino functional polyorganosiloxane through an alkylene or cycloalkylene linking group. Optionally, the amino functional polyorganosiloxane may have a number average molecular weight of at least about 2000; and often about 2,000 to 5,000 may be quite suitable for use in forming the present coatings.

In embodiment (C), the ratio of isocyanate groups to hydroxyl plus amino groups in the mixture may be at least 1.0. Optionally, the ratio of isocyanate groups to hydroxyl plus amino groups in the mixture may be 1.05 to 1.2. Optionally, the amino functional polyorganosiloxane may have a number average molecular weight of no more than about 50,000, preferably about 5,000 to 30,000, and more preferably about 10,000 to 25,000. Optionally, the ratio of isocyanate groups to hydroxyl plus amino groups in the mixture may be at least 1.0. Optionally, the polyol may include polyol having at least three hydroxy groups and/or the polyisocyanate includes diisocyanate trimer.

The polymeric material of embodiment (C) may comprise about 5 wt % to 30 wt % of the amino functional polyorganosiloxane. Optionally the polyol of embodiment (C) may comprise polycaprolactone polyol. Optionally the polyol may comprise hydroxy-functional poly(meth)acrylate. Optionally, the hydroxy-functional poly(meth)acrylate of embodiment (C) may be formed from a monomer mixture comprising hydroxyalkyl acrylate and alkyl acrylate. Optionally, the hydroxy-functional poly(meth)acrylate may be formed from a monomer mixture comprising hydroxyalkyl acrylate, alkyl acrylate and alkyl methacrylate. Optionally the mixture of embodiment (C) may comprise about 30 wt % to 85 wt % of polyisocyanate. Optionally the polyol of embodiment (C) may comprise a polycaprolactone polyol, e.g., where the polycaprolactone polyol may comprise polycaprolactone triol having an average hydroxyl equivalent weight of about 150 to 200. Optionally the polyisocyanate of embodiment (C) may have an average isocyanate equivalent weight of about 150 to 600, and desirably about 250 to 450. Optionally, the polyisocyanate may comprise isophorone diisocyanate, hexamethylene diisocyanate, oligomers thereof or a mixture thereof.

In another embodiment (D) a crosslinked polysiloxane-modified polyurethane coating may be formed from a mixture comprising: an amino functional polyorganosiloxane that may have one or more amino groups attached to a single end of the polyorganosiloxane; polyisocyanate; and polyol. Optionally, the polyorganosiloxane may be a mono-amino functional polydialkylsiloxane. Optionally, the polyorganosiloxane may be a mono-amino functional polydimethylsiloxane. Optionally, the polyorganosiloxane may be an aminoalkyl terminated polydimethylsiloxane having amino group(s) only on a single end of the polysiloxane chain.

One embodiment (E) provides polymeric material that may be prepared by reacting a composition comprising: polyol; polyisocyanate; and amino functional poly(dialkylsiloxane) having one or more functional groups, such as an amino group, capable of reacting with the polyisocyanate. Optionally, the amino functional poly(dialkylsiloxane) may have a number average molecular weight of at least about 1,000. The amino functional poly(dialkylsiloxane) may typically be an amino functional poly(dimethylsiloxane) having an alkylamino group on a single end (i.e., an amino group connected to the end of the polysiloxane chain. Often, the amino functional poly(dimethylsiloxane) may include about 10 to 50 subunits.

Another embodiment (F) provides a substrate that may have a surface capable of being exposed to aquatic conditions, where the surface has a fouling release coating thereon, and where the coating comprises a polymeric material prepared by reacting a mixture comprising: an amino functional poly (dialkylsiloxane) having one or more amino groups attached to a single end of the polyorganosiloxane; polyisocyanate; and polyol. Optionally, the polyorganosiloxane may be a mono-amino functional polydialkylsiloxane. Optionally, the polyorganosiloxane may be a mono-amino functional polydimethylsiloxane. Optionally, the polyorganosiloxane may be an aminoalkyl terminated polydimethylsiloxane having amino group(s) only on a single end of the polysiloxane chain. Optionally, the polyol may comprise hydroxy-functional poly(meth)acrylate. Optionally, the polyol may comprise polycaprolactone triol. Optionally, the polyol may comprise hydroxy-functional poly(meth)acrylate. Optionally, the polyisocyanate may comprise hexamethylene diisocyanate trimer, isophorone diisocyanate trimer, or a mixture thereof. Optionally, the surface exposed to aquatic conditions may be a surface exposed to salt water. Optionally, the surface exposed to aquatic conditions may be a surface exposed to fresh water.

It will be readily apparent to one skilled in the art that varying substitutions and modifications may be made to the methods and compositions disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention.

What is claimed is:

1. A polymeric material prepared by reacting a mixture comprising:
   polyisocyanate;
   polyol; and
   a polysiloxane component having two or more polyorganosiloxane chains attached to a linker group, which has one or more functional groups capable of reacting with the polyisocyanate attached thereto.

2. The polymeric material of claim 1, wherein the linker molecule has one or more amino groups attached thereto; the polyisocyanate comprises hexamethylene diisocyanate trimer, isophorone diisocyanate trimer, or a mixture thereof; and the polyol comprises hydroxy-functional poly(meth)acrylate, polycaprolactone polyol, or a mixture thereof.

3. The polymeric material of claim 1, wherein the polysiloxane component is a reaction product of reaction of a silane-terminated polydimethylsiloxane with pentaerythritol triallyl ether, pentaerythritol diallyl ether, trimethylolpropane diallyl ether or a mixture thereof.

4. A polymeric material prepared by reacting a mixture comprising:
   polyisocyanate;
   polyorganosiloxane having one or more reactive functional groups attached to only a single end of the polyorganosiloxane; and
   polyol which comprises hydroxyl-functional poly(meth)acrylate, polycaprolactone polyol, or a mixture thereof; wherein the reactive functional groups are hydroxyl alkyl carbamate groups or amino groups.

5. The polymeric material of claim 4 wherein the polysiloxane component has a formula I:

where R'Si— is a terminal group;
n is about 10 to 1,000;
LINK is a linking group;
X is —NH$_2$; and
y is an integer from 1 to 4.

6. The polymeric material of claim 5, wherein the LINK is an alkylene group, which may have one or more oxygen, nitrogen or sulfur atoms substituted for a carbon atom of its backbone; the LINK has no more than about 10 atoms in its backbone; and R'Si— is a trialkylsilyl group.

7. The polymeric material of claim 4, wherein the polyorganosiloxane includes poly(dialkylsiloxane) having one or more amino groups attached to only a single end.

8. The polymeric material of claim 7, wherein the polyorganosiloxane has (a) two or more amino groups attached to only a single end of the polyorganosiloxane.

9. A substrate having a surface capable of being exposed to aqueous conditions; wherein the surface has a fouling release coating thereon; the fouling release coating comprises the polymeric material of claim 7; the fouling release coating has an initial water contact angle of at least about 100°; and the water contact angle of the fouling release coating changes by no more than about 10° after immersion in deionized water for 30 days.

10. The substrate of claim 9, wherein the fouling release coating has an initial pseudobarnacle pull off adhesion release force of no more than about 80 N.

11. The polymeric material of claim 4, wherein the mixture has a ratio of (isocyanate groups)/(amine+alcohol groups) of about 1.0 to 1.2.

12. The polymeric material of claim 4, wherein the polyisocyanate comprises hexamethylene diisocyanate trimer, isophorone diisocyanate trimer, or a mixture thereof.

13. A coating composition comprising the mixture according to claim 4.

14. A method of inhibiting fouling on a surface exposed to aqueous conditions comprising applying the coating composition of claim 13 to the surface.

15. A method of inhibiting fouling on a surface exposed to aqueous conditions comprising applying the coating composition of claim 13 to the surface;
   wherein the coating composition comprises:
      about 2 to 20 wt. % (on a solids basis) of an amino functional polyorganosiloxane, wherein the amino functional polyorganosiloxane has one or more amino groups attached to only a single end of the polyorganosiloxane; from about 30 wt. % to 85 wt. % (on a solids basis) of polyisocyanate; and the polyol.

16. The method of claim 15, wherein the polyorganosiloxane has a number average molecular weight of about 1,000 to 20,000;
   the polyisocyanate comprises hexamethylene diisocyanate trimer, isophorone diisocyanate trimer, or a mixture thereof; and
   the coating composition has a ratio of (isocyanate groups)/(amine+alcohol groups) of about 1.05 to 1.15.

17. A substrate having a surface capable of being exposed to aqueous conditions; wherein the surface has a coating thereon; and the coating comprises the polymeric material of claim 4.

18. The substrate of claim 17, wherein the coating has an initial water contact angle of at least about 100°.

19. The substrate of claim 18, wherein the water contact angle of the coating changes by no more than about 10° after immersion in deionized water for 30 days.

20. The substrate of claim 17, wherein the coating has an initial pseudobarnacle pull off adhesion release force of no more than about 80 N.

21. A polymeric material formed from reactants which comprise:
polyisocyanate;
polydialkylsiloxane having one or more amino groups attached to only a single end of the polyorganosiloxane; and
polyol, which includes a polyester polyol, acrylic polyol or a mixture thereof.

22. The polymeric material of claim 21, wherein the polyol comprises polyester polyol.

23. The polymeric material of claim 22, wherein the polyester polyol comprises polycaprolactone polyol, poly(hexamethylene adipate) or a mixture thereof.

24. The polymeric material of claim 21, wherein the polyol comprises acrylic polyol.

25. The polymeric material of claim 24, wherein the acrylic polyol comprises hydroxy-functional poly(meth)acrylate.

26. The polymeric material of claim 24, wherein the acrylic polyol is formed from monomers which include hydroxyalkyl acrylate, alkyl acrylate, alkyl methacrylate or a mixture thereof.

27. The polymeric material of claim 24, wherein the acrylic polyol is formed from monomers, which include hydroxyethyl acrylate, hydroxyethyl methacrylate, hydroxypropyl acrylate, hydroxypropyl methacrylate or a mixture thereof.

28. The polymeric material of claim 21, wherein the polysiloxane component has a formula I:

where R'Si— is a trialkylsilyl group;
n is about 10 to 1,000;
LINK is an alkylene group having no more than about 10 carbon atoms in its backbone;
X is —NH$_2$; and
y is an integer from 1 to 4.

29. The polymeric material of claim 28, wherein the polyol comprises acrylic polyol; and the polyisocyanate comprises isophorone diisocyanate, hexamethylene diisocyanate, methylene diphenyl diisocyanate, oligomers thereof or a mixture thereof.

30. The polymeric material of claim 28, wherein the amino functional polyorganosiloxane has a number average molecular weight of about 500 to 30,000.

31. A substrate having a surface capable of being exposed to aqueous conditions; wherein the surface has a coating comprising the polymeric material of claim 30 thereon; and the coating has an initial water contact angle of at least about 100°.

* * * * *